United States Patent
Golden et al.

(10) Patent No.: US 9,454,599 B2
(45) Date of Patent: Sep. 27, 2016

(54) AUTOMATIC DEFINITION OF ENTITY COLLECTIONS

(71) Applicant: GOOGLE INC., Mountain View, CA (US)

(72) Inventors: Keith Golden, San Francisco, CA (US); Ben Hutchinson, San Francisco, CA (US); Amit Behal, San Jose, CA (US); Alexander Oliver Marks, San Francisco, CA (US); Faen Zhang, Beijing (CN); Yuan Gao, Beijing (CN); Fei Wu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 259 days.

(21) Appl. No.: 14/186,320

(22) Filed: Feb. 21, 2014

(65) Prior Publication Data
US 2015/0100568 A1   Apr. 9, 2015

Related U.S. Application Data

(63) Continuation of application No. PCT/CN2013/001213, filed on Oct. 9, 2013.

(51) Int. Cl.
*G06F 17/30* (2006.01)

(52) U.S. Cl.
CPC .............................. *G06F 17/30651* (2013.01)

(58) Field of Classification Search
CPC ............................................. G06F 17/30651
USPC ........................................................ 707/722
See application file for complete search history.

(56) References Cited

U.S. PATENT DOCUMENTS 6,128,613 A * 10/2000 Wong ............... G06F 17/30616
707/738

7,305,409 B2 * 12/2007 Lord ................... G06F 17/3061
707/798

(Continued)

FOREIGN PATENT DOCUMENTS

CN     101059824 A    10/2007
CN     101149756 A    3/2008

(Continued)

OTHER PUBLICATIONS

Bostandjiev, Svetlin, et al., "WiGipedia: A Tool for Improving Structured Data in Wikipedia", ICSC 2011, Palo Alto, CA, Sep. 18-21, 2011, pp. 328-335.*

(Continued)

*Primary Examiner* — Robert Stevens
(74) *Attorney, Agent, or Firm* — Brake Hughes Bellermann LLP

(57) ABSTRACT

A system for automatically generating entity collections comprises a data graph including entities connected by edges and instructions that cause the computer system to determine a set of entities from the data graph and to determine a set of constraints that has a quantity of constraints. A constraint in the set represents a path in the data graph shared by at least two of the entities in the set of entities. The instructions also cause the computer system to generate candidate collection definitions from combinations of the constraints, where each candidate collection definition identifies at least one constraint and no more than the quantity of constraints. The instructions also cause the computer system to determine an information gain for at least some of the candidate collection definitions, and store at least one candidate collection definition that has an information gain that meets a threshold as a candidate collection.

26 Claims, 13 Drawing Sheets

(56) References Cited

U.S. PATENT DOCUMENTS

| | | | |
|---|---|---|---|
| 7,502,770 | B2 | 3/2009 | Hillis et al. |
| 7,587,387 | B2 | 9/2009 | Hogue |
| 7,672,937 | B2 | 3/2010 | Madhavan et al. |
| 7,765,206 | B2 | 7/2010 | Hillis et al. |
| 7,769,579 | B2 | 8/2010 | Zhao et al. |
| 7,774,328 | B2 | 8/2010 | Hogue et al. |
| 7,792,837 | B1 | 9/2010 | Zhao |
| 7,925,610 | B2 | 4/2011 | Elbaz et al. |
| 7,933,915 | B2* | 4/2011 | Singh ............... G06F 17/30958 707/760 |
| 8,051,104 | B2 | 11/2011 | Weissman et al. |
| 8,069,127 | B2* | 11/2011 | Taylor .................. G06N 3/126 706/13 |
| 8,122,026 | B1 | 2/2012 | Laroco, Jr. et al. |
| 8,145,636 | B1* | 3/2012 | Jeh ..................... G06F 17/30707 707/736 |
| 8,180,804 | B1 | 5/2012 | Narayanan et al. |
| 8,204,856 | B2 | 6/2012 | Meyer et al. |
| 8,271,480 | B2 | 9/2012 | Diab et al. |
| 8,370,128 | B2 | 2/2013 | Brun et al. |
| 2008/0306934 | A1 | 12/2008 | Craswell et al. |
| 2009/0094211 | A1 | 4/2009 | Marvit et al. |
| 2010/0121839 | A1 | 5/2010 | Meyer et al. |
| 2010/0185994 | A1 | 7/2010 | Pikus et al. |
| 2011/0040776 | A1 | 2/2011 | Najm et al. |
| 2011/0221754 | A1 | 9/2011 | Wang et al. |
| 2011/0295857 | A1* | 12/2011 | Aw ..................... G06F 17/30616 707/739 |
| 2011/0313979 | A1* | 12/2011 | Roberts ............... G06F 17/3051 707/690 |
| 2012/0078961 | A1* | 3/2012 | Goenka ............. G06F 17/30893 707/778 |
| 2012/0109966 | A1* | 5/2012 | Liang ................ G06F 17/30643 707/740 |
| 2012/0191716 | A1* | 7/2012 | Omoigui ............. H01L 27/1463 707/740 |
| 2012/0254188 | A1* | 10/2012 | Koperski .......... G06F 17/30663 707/740 |
| 2013/0124538 | A1* | 5/2013 | Lee ..................... G06F 17/3053 707/749 |
| 2013/0191372 | A1* | 7/2013 | Lee ................... G06F 17/30958 707/722 |
| 2013/0191416 | A1* | 7/2013 | Lee ................... G06F 17/30979 707/771 |
| 2013/0212081 | A1 | 8/2013 | Shenoy et al. |
| 2014/0025702 | A1* | 1/2014 | Curtiss ................. G06Q 50/01 707/769 |
| 2015/0100605 | A1 | 4/2015 | Golden et al. |

FOREIGN PATENT DOCUMENTS

| | | |
|---|---|---|
| CN | 101996287 A | 3/2011 |
| CN | 102880687 A | 1/2013 |
| CN | 103020096 A | 4/2013 |
| WO | 00/14651 A1 | 3/2000 |
| WO | 2010/085523 A1 | 7/2010 |

OTHER PUBLICATIONS

Carmel, David, et al., "Enhancing Cluster Labeling Using Wikipedia", SIGIR '09, Boston, MA, Jul. 19-23, 2009, pp. 139-146.*

Engle, Jeremy T., et al., "Mining Relatedness Graphs for Data Integration", Proc. of the 34th Annual Conf. of the Cognitive Science Society (CogSci 2012), Sapporo, Japan, Aug. 1-4, 2012, pp. 1524-1529.*

Guo, Jiafeng, et al., "A structured Approach to Query Recommendation with Social Annotation Data", CIKM '10, Toronto, Ontario, Canada, Oct. 25-29, 2010, pp. 619-628.*

Jain, Alpa, et al., "Organizing Query Completions for Web Search", CIKM '10, Toronto, Ontario, Canada, Oct. 25-29, 2010, pp. 1169-1176.*

Kang, U., et al., "GBASE: A Scalable and General Graph Management System", KDD'11, San Diego, CA, Aug. 21-24, 2011, pp. 1091-1099.*

Ngomo, Axel-Cyrille Ngonga, et al., "Disentangling the Wikipedia Category Graph for Corpus Extraction", Polibits, vol. 39, © 2009, pp. 5-10.*

Song, Yang, et al., "Query Suggestion by Constructing Term-Transition Graphs", WSDM '12, Seattle, WA, Feb. 8-12, 2012, pp. 353-362.*

Strube, Michael, et al., "WikiRelate! Computing Semantic Relatedness Using Wikipedia", AAAI, vol. 6, American Association for Artificial Intelligence (www.aaai.org), © 2006, pp. 1419-1424.*

Syed, Zareen, et al., "Automatic Discovery of Semantic Relations using MindNet", Proc. of the 7th Int'l Conf. on Language Resources and Evaluation (LREC 2010), © 2010, 8 pages.*

Toral, Antonio, et al., "A study on Linking Wikipedia categories to Wordnet synsets using text similarity", RANLP 2009, Borovets, Bulgaria, © 2009, pp. 449-454.*

Wang, Weiduo, et al., "Website Clustering from Query Graph using Social Network Analysis", ICEMMS, Beijing, China, Aug. 8-10, 2010, pp. 439-442.*

Zhang, Ruofei, et al., "A Data Mining Approach to Modeling Relationships Among Categories in Image Collection", KDD '04, Seattle, WA, Aug. 22-25, 2004, pp. 749-754.*

The American Heritage College Dictionary, 4th Ed., Houghton Mifflin Co., Boston, MA, © 2002, pp. 347-348 and 1260.*

"Automatic Summarization", from Wikipedia, the free encyclopedia, retrieved from http://en.wikipedia.org/wiki/Automatic_summarization, Feb. 25, 2013, 12 pages.

"Concept Mining", from Wikipedia, the free encyclopedia, retrieved from http://en.wikipedia.org/wiki/Concept_mining, Apr. 1, 2012, 2 pages.

"Personalization", from Wikipedia, the free encyclopedia, retrieved from http://en.wikipedia.org/wiki/Personalization, Feb. 26, 2013, 6 pages.

Lao, et al., "Random Walk Inference and Learning in a Large Scale Knowledge Base", Conference on Empirical Methods in Natural Language Processing, 2011, 11 pages.

Lao, et al., "Relational Retrieval Using a Combination of Path-Constrained Random Walks", Mach Learn, vol. 81, Jul. 22, 2010, pp. 53-67.

Lao, Ni, "Efficient Random Walk Inference with Knowledge Bases", Thesis, The Carnegie Mellon University, Jul. 2012, 139 pages.

Lao, et al., "Reading the Web with Learned Syntactic-Semantic Inference Rules", Proceedings of the 2012 Joint Conference on Empirical Methods in Natural Language Processing and Computational Natural Language Learning, 2012, 10 pages.

Kahng, et al., "Ranking Objects by Following Paths in Entity-Relationship Graphs", PIKM '11, Oct. 28, 2011, pp. 11-18.

Singh, et al., "Large-Scale Cross-Document Coreference Using Distributed Inference and Hierarchical Models", Proceedings of the 49th Annual Meeting of the Association for Computational Linguistics: Human Language Technologies, vol. 1, 2011, 11 pages.

Lao, et al., "Fast Query Execution for Retrieval Models Based on Path-Constrained Random Walks", KDD '10, Jul. 25-28, 2010, pp. 881-888.

Kersting, et al., "Counting Belief Propagation", Appears in Proceedings of the Twenty-Fifth Conference on Uncertainty in Artificial Intelligence (UAI 2009), May 2012, 8 pages.

Yedidia, et al., "Understanding Belief Propagation and its Generalizations", Mitsubishi Electric Research Laboratories, Nov. 2001, 36 pages.

Lardinois, "Google's Knowledge Graph Now Explains Connections Between Your Query and Items in 'People Also Search for' Section", TechCrunch, Oct. 19, 2012, 6 pages.

Mayfield, et al., "ERACER: A Database Approach for Statistical Inference and Data Cleaning", SIGMOD '10, Jun. 6-11, 2010, 12 pages.

International Search Report and Written Opinion for PCT Application No. PCT/CN2013/001213, mailed on Jul. 18, 2014, 9 pages.

* cited by examiner

AUTOMATIC DEFINITION OF ENTITY COLLECTIONS

RELATED APPLICATION

This application is a continuation under 35 U.S.C. §120 of PCT Application No. PCT/CN2013/001213, filed Oct. 9, 2013, entitled "AUTOMATIC DEFINITION OF ENTITY COLLECTIONS." The disclosure of this earlier-filed application is incorporated herewith in its entirety.

BACKGROUND

Large graph-based knowledge bases represent factual information about the world. For example, in a data graph, entities, such as people, places, things, concepts, etc., may be stored as nodes and the edges between nodes may indicate a relationship between the entities. The basic unit of such a data graph can be a triple that includes two nodes, or entities, and an edge. The triple is sometimes referred to a subject-predicate-object triple, with one node acting as the subject, the second node acting as the object, and the relationship acting as the predicate. Of course, a triple may include additional information, such as metadata about the entities and/or the relationship, in addition to identifying the subject, predicate, and object.

The number of nodes and edges in a semantic network can be large, and it may be difficult to understand entities at a higher level because the factual information represented by a triple is often fine-grained, for example representing marriage relationships, membership in a musical group, and other discrete facts. However, in many applications it is more useful to assign entities into collections that represent more general facts about the entity. For example, it may be more useful to know that someone is a father or a guitarist in a band rather than to know the fine-grained details of who the child of the person is or the exact album the guitarist played on. Collections are used extensively in search, data mining, ad targeting, recommendation systems, etc. However, creation of entity collections for graphs has been a manual process, which does not scale to large graphs.

SUMMARY

Some implementations enable a system to automatically identify potentially useful entity collections and to automatically assign entities in a large graph to the collections. The system may identify potentially useful collections using search records, text-based category assignments, or may form a group of entities identified by a user. The system may generate rules for membership in the potentially useful collections, evaluate the rules to identify candidate collections, generate a name (or names) for each of the candidate collections, and rank or score the candidate collections to determine which collections to publish for use with the data graph. Some implementations include a language for defining the rules of membership in candidate and published collections. For example, a collection may be defined by expressing the sufficient conditions for membership. In one implementation, the conditions may be expressed in conjunctive normal form. A condition may represent one constraint or two or more disjunctive constraints. A constraint may have one of five formats; Exists, Not Exists, Equals, Not Equals, and a Template format. For published collections, some implementations may efficiently generate an entity's membership in each of the published collections in a single pass of the entity's neighborhood. The efficient generation may include building an index for the published collections. The system may use the index to evaluate paths from the entity to determine which collection conditions are satisfied and generate an indication of membership in the graph.

One aspect of the disclosure can be embodied in a system that includes at least one processor and one or more memories. The one or more memories may store a data graph that includes entities connected by edges and instructions that, when executed by the at least one processor, cause the computer system perform operations. The operations may include determining a first set of entities from the data graph and determining a second set of constraints, the second set including a quantity of constraints, wherein a constraint in the second set represents a path in the data graph shared by at least two of the entities in the first set. The operations may also include generating candidate collection definitions from combinations of the constraints in the second set, where each candidate collection definition identifies at least one constraint from the second set and no more than the quantity of constraints and determining an information gain for at least some of the candidate collection definitions. The operations include storing at least one of the candidate collection definitions as a candidate collection in the one or more memories, the candidate collection having an information gain that meets a threshold.

The system can include one or more of the following features. For example, determining the first set of entities may include selecting a category from a crowd-sourced document corpus and determining entities identified by the category. As another example, determining the first set of entities may include identifying a popular query from search records, converting the popular query to at least one semantic query, and executing the at least one semantic query against the data graph to obtain a query result, wherein the first set of entities is the query result from the data graph. Converting the popular query to the at least one semantic query may include converting the popular query to a plurality of semantic queries, running each of the plurality of semantic queries against the data graph, and determining a plurality of sets of entities, a set of the plurality of sets representing entities responsive to one of the semantic queries.

As another example, the instructions may further include instructions that, when executed by the at least one processor, cause the computer system to generate a collection name for the candidate collection definition based on properties from the data graph associated with the constraints of the candidate collection definition. In some such implementations, generating the collection name includes, for each constraint associated with the candidate collection definition: when the constraint identifies a relationship and an object entity, determining a name for the object entity and pluralizing the name and when the constraint identifies a relationship without an object entity, determining a name for the relationship. Generating the collection name may also include generating the collection name from a combination of the determined names for the constraints associated with the candidate collection definition.

In some implementations, determining the second set of constraints can include generating a correlation score for respective constraints and using the correlation scores to select the quantity of constraints. In some implementations, the instructions further include instructions that, when executed by the at least one processor, cause the computer system to score the candidate collection based on search records and publish the candidate collection definition when the score meets a score threshold. Scoring the candidate collection can include generating queries from the candidate collection, inspecting the search records for popularity indicators for the generated queries, and using the popularity indicators to score the candidate collection. Publishing the candidate collection may occur subsequent to curation of a collection name.

As another example, the instructions may further include instructions that, when executed by the at least one processor, cause the computer system to determine that a first candidate collection definition and a second candidate collection definition are compatible and merge the first candidate collection definition and the second candidate collection definition into a third candidate collection definition responsive to the determining. Determining that the first candidate collection definition and the second candidate collection definition are compatible may include determining that a constraint for the first candidate collection definition is equivalent with a constraint for the second candidate collection definition and generating a condition for the third candidate collection definition that represents a union of the constraint for the first candidate collection definition and the constraint for the second candidate collection definition.

One or more memories may further store a table indicating relationship equivalencies. In such implementations, the instructions can further include instructions that cause the computer system to determine that the constraint for the first candidate is a relationship in the table for a particular equivalency and convert the constraint for the first candidate to a first union that includes the equivalents for the constraint. The instructions can further include instructions that cause the computer system to determine that the constraint for the second candidate is a second relationship in the table for the particular equivalency and convert the constraint for the second candidate to a second union that includes the equivalents for the constraint. The instructions can further include instructions that cause the computer system to determine that the first union and the second union are identical, wherein the condition for the third candidate represents the first union.

One or more memories may further store a table indicating source constraints for a target constraint. In such implementations, the instructions can further include instructions that cause the computer system to determine that the constraint for the first candidate is a source constraint for the target constraint and convert the constraint for the first candidate to the target constraint. The instructions can further include instructions that cause the computer system to determine that the constraint for the second candidate is a source constraint for the target constraint and convert the constraint for the second candidate to the target constraint. The instructions further include instructions that cause the computer system to determine that the converted constraints are identical, wherein the condition for the third candidate represents the target constraint.

In another aspect, a computer-implemented method includes determining, using at least one processor, a first set of entities from a data graph of entities connected by edges and determining a plurality of constraints, each constraint representing a path and target node shared by at least two of the entities in the first set. The method also includes generating, using the at least one processor, a correlation score for each of the plurality of constraints and using the correlation scores to select a quantity of constraints for a set of constraints. The method further includes generating, using the at least one processor, candidate collection definitions from combinations of the set of constraints, where each candidate collection definition identifies at least one constraint from the set of constraints and no more than the quantity of constraints, determining an information gain for at least some of the candidate collection definitions, and storing at least one of the candidate collection definitions as a candidate collection in a memory, the candidate collection having an information gain that meets a threshold.

The method can include one or more of the following features. For example, determining the first set of entities may include selecting a category from a crowd-sourced document corpus and determining entities identified by the category. As another example, determining the first set of entities can include identifying a popular query from search records, converting the popular query to a semantic query and executing the at least one semantic query against the data graph to obtain a query result, wherein the first set of entities is the query result from the data graph. In another example, the method may also include generating a collection name for the candidate collection definition based on properties from the data graph associated with the constraints of the candidate collection definition and/or scoring the candidate collection based on search records and using the score to prioritize the candidate collection for name curation. In some implementations, the candidate collection is a first candidate collection and the method further includes determining that the first candidate collection and a second candidate collection are compatible and merging the first candidate collection and the second candidate collection into a third candidate collection definition responsive to the determining.

In another aspect, a computer system includes at least one processor and one or more memories. The one or more memories may store a data graph including entities connected by edges, candidate collection definitions, each collection definition including one or more constraints, a constraint representing a path in the data graph, and instructions that, when executed by the at least one processor, cause the computer system to perform operations. The operations may include generating a name for a first candidate collection definition of the candidate collection definitions based on properties from the data graph associated with the constraints of the candidate collection definition and providing the name as a suggestion to a curator of the candidate collection definitions.

The computer system may include one or more of the following features. For example, generating the name can include, for each constraint associated with the candidate collection definition, when the constraint identifies a relationship and an object entity, determining a name for the object entity and pluralizing the name, and when the constraint identifies a relationship without an object entity, determining a name for the relationship. In such an implementation, generating the name may also include generating the name from a combination of the determined names for the constraints associated with the candidate collection definition. As another example, the data graph can include a mediator for a relationship and generating the name for the first candidate collection definition includes determining that a constraint associated with the candidate collection definition includes the relationship with the mediator; and using the mediator in generating the name. In some implementations, the operations may also include generating the name when it is determined that the first candidate collection definition does not include a condition with disjunctive constraints and/or generating at least two names based on the properties from the data graph and providing the at least two names as suggestions.

In another aspect, a computer system includes at least one processor and one or more memories. The one or more memories may store a data graph of nodes connected by edges, store an index of constraints from collection definitions, a definition specifying at least one condition with at least one constraint, each constraint having a constraint type, a constraint expression, and wherein multiple conditions in the definition are conjunctive, and store instructions that, when executed by the at least one processor, cause the system to perform operations. The operations may include evaluating an edge for a node in the data graph against the index to determine conditions met by the edge and its associated neighborhood, and repeating the evaluating for each edge associated with the node in the data graph. The operations may also include determining that conditions for a first collection are met and generating an indication in the data graph that the node is a member of the first collection.

The computer system can include one or more of the following features. For example, multiple constraints associated with a condition in the collection definition are disjunctive and/or the index can include an index for each constraint type. As another example, for at least one constraint, the constraint type can be a template type, and the constraint expression includes a path in the data graph and variable representing a target node. In such an implementation a collection identifier may be dependent on a value for the variable, so that the system generates a new collection for unique target nodes. As another example, the memory may further store a collection condition data structure for each collection definition and the operations may also include initializing the collection condition data structure for the node prior to evaluating the edge for the node to indicate no conditions are met and, as part of determining conditions met by the edge, setting a flag for a first collection-condition pair to true when the edge and its associated neighborhood meet a first constraint, the first collection-condition pair being associated with the constraint expression of the first constraint in the index.

In some implementations, generating the indication includes generating an edge in the data graph between the node and an entity representing the first collection. In such implementations, the instructions can include a batch process that causes the system to evaluate each edge associated with a plurality of nodes in the data graph, the evaluation determining collection membership for the evaluated nodes in a plurality of collections, and generate edges in the data graph between collection entities and nodes determined to be members of the collection represented by the collection entity. In such implementations, the system may also include instructions that cause the system to receive a query for the data graph, determine that the entity representing the first collection is responsive to the query, and use the edge in the data graph to provide the node as a response to the query.

As another example, the operations may also include receiving a query for the data graph, the query identifying the node in the data graph, performing the evaluating for each edge associated with the node to determine collection membership for the node, and returning the collections the node is a member of. In another example, for at least one constraint, the constraint type is an Equals type, and the constraint expression includes a path and a terminal node, so that for the node to match the at least one condition, a path from the node ends at the target node. In some implementations the constraint expression includes a function applied to a value associated with the terminal node. In some implementations and/or at least one constraint expression identifies a different collection, the constraint expression is a path of two or more edges, and/or membership of the node in each collection is evaluated in a single traversal of the node's neighborhood.

In another aspect, a method includes initializing, using at least one processor, first data structures for a node in a data graph, each first data structure corresponding to a particular collection and including a first flag for each condition in the collection, the first flag indicating condition met or condition not met. The method also includes initializing, using the at least one processor, second data structures for the node, each second data structure corresponding to a particular collection with a condition having a constraint that represents exclusion, the second data structure including a second flag for the condition indicating violation found or no violation found. The method also includes evaluating a relationship and its neighborhood for the node against constraint expressions in a collection index and, for each constraint expression satisfied by the relationship and its neighborhood, if the constraint expression represents inclusion, setting, in the first data structure, a first flag for a condition of a collection associated with the constraint expression in the index to indicate condition met and if the constraint expression represents exclusion, setting, in the second data structure, a second flag for a condition of a collection associated with the constraint expression to violation found. The method also includes repeating the evaluating and setting for remaining relationships for the node in the data graph. The method may further include, for each second data structure, determining whether a second flag indicates violation not found and when the second flag indicates violation not found, setting, in the first data structure, a first flag for the condition and collection associated with the second flag to indicate condition met. The method may further include, for each first data structure, determining whether the first flag for each condition indicates condition met and, when the first flags for each condition indicates condition met, generating a relationship in the data graph that indicates that the node is a member of the collection corresponding to the data structure.

The method may include one or more of the following features. For example a first condition of a first collection may be associated with a first constraint and a second constraint, and the index can include two entries for the first condition of the first collection. The first entry of the two entries may have a first constraint expression for the first constraint that is associated with the first condition of the first collection. The second entry of the two entries may have a second constraint expression for the second constraint that is associated with the first condition of the first collection. In some implementations the first constraint has a constraint type that indicates the first constraint is exclusive. In some implementations, the second constraint has a template constraint type and the second constraint expression identifies a path and variable. In some implementations, the first constraint expression identifies another collection.

In another aspect, a computer system may include at least one processor and at least one memory storing a data graph of nodes connected by edges and a plurality of collection definitions. A collection definition may include a collection identifier and one or more conditions to be satisfied for membership in the collection, a condition being a single constraint or a group of constraints, wherein when one constraint of the group is satisfied, the condition is satisfied. A constraint may have a constraint type and a constraint expression. The at least one memory may also store instructions that, when executed by the at least one processor, cause the system to generate an index for the plurality of collection definitions, each constraint of the collection definitions having an index entry. The index entry can include the constraint type, the constraint expression, the collection identifier, and an indication of the condition within the collection that is associated with the constraint. The index can be used to determine collection membership for nodes in the data graph in a single pass of the node's neighborhood.

The computer system may include one or more of the following features. For example, the collection definition may include a whitelist that identifies nodes to be included in the collection regardless of the one or more conditions and/or a blacklist that identifies nodes to be excluded from the collection regardless of the one or more conditions. As another example, the constraint type can be selected from the group Equals, Not Equals, Exists, Not Exists, and Template. In some implementations, the constraint expression for constraint types of Exists and Not Exists specifies a path without a target node and the constraint expression for constraint types of Equals and Not Equals specifies a path with a target node. In some implementations, the constraint expression includes a value function applied to the target node. As another example, the constraint expression for constraint types of Template specifies a path with a variable. In such implementations, a first condition can have two constraints, a first constraint with a Template constraint type and a first constraint expression that specifies a first path and a first variable, and a second constraint with a Template constraint type and a second constraint expression that specifies a second path and the first variable.

In one general aspect, a computer program product embodied on a non-transitory computer-readable storage device includes instructions that, when executed by at least one processor, cause a computing device to perform any of the disclosed methods, operations, or processes. In another general aspect, a system and/or method for defining entity collections and efficiently determining collection membership for entities in a large data graph, substantially as shown in and/or described in connection with at least one of the figures, as set forth more completely in the claims.

One or more of the implementations of the subject matter described herein can be implemented so as to realize one or more of the following advantages. As one example, the system may be able to automatically identify interesting entity collections. The system may use search records as an indication of a collection of entities that may be part of a collection with increasing or ongoing newsworthiness. The system may also be able to automatically generate a large number of collections, rank the collections to determine which may be of relatively greater importance, and either automatically publish the collections for use in the data graph or prioritize the collections for human contributors to review. The system beneficially determines what attributes entities may have in common as well as providing a label for summarizing what the commonality is. Clustering is unable to provide such details. The system also does not require a pre-existing label or training data to define potentially useful clusters.

As another example, the system uses a method of defining collections that is flexible, and enables expressive collections to be defined. As another example, the system can efficiently determine entity membership in the collections. For example, collection membership for an entity in a data graph with hundreds of thousands or even millions of entities may be determined in less than 10 milliseconds. In another example, the system may calculate collection membership for an entity in time O (number of property-values an entity has). This is in contrast to nested loops, which make take time O (number of property-values an entity has*number of collection constraints). This enables collection membership to be determined in real time, so that collection membership is fresh and can be used effectively in querying and analyzing the data graph. In another example, the system may validate the consistency of potential new data by analyzing the data graph to determine if the new data implies membership in inconsistent collections. If so, the system may flag the potential new data as erroneous data. The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
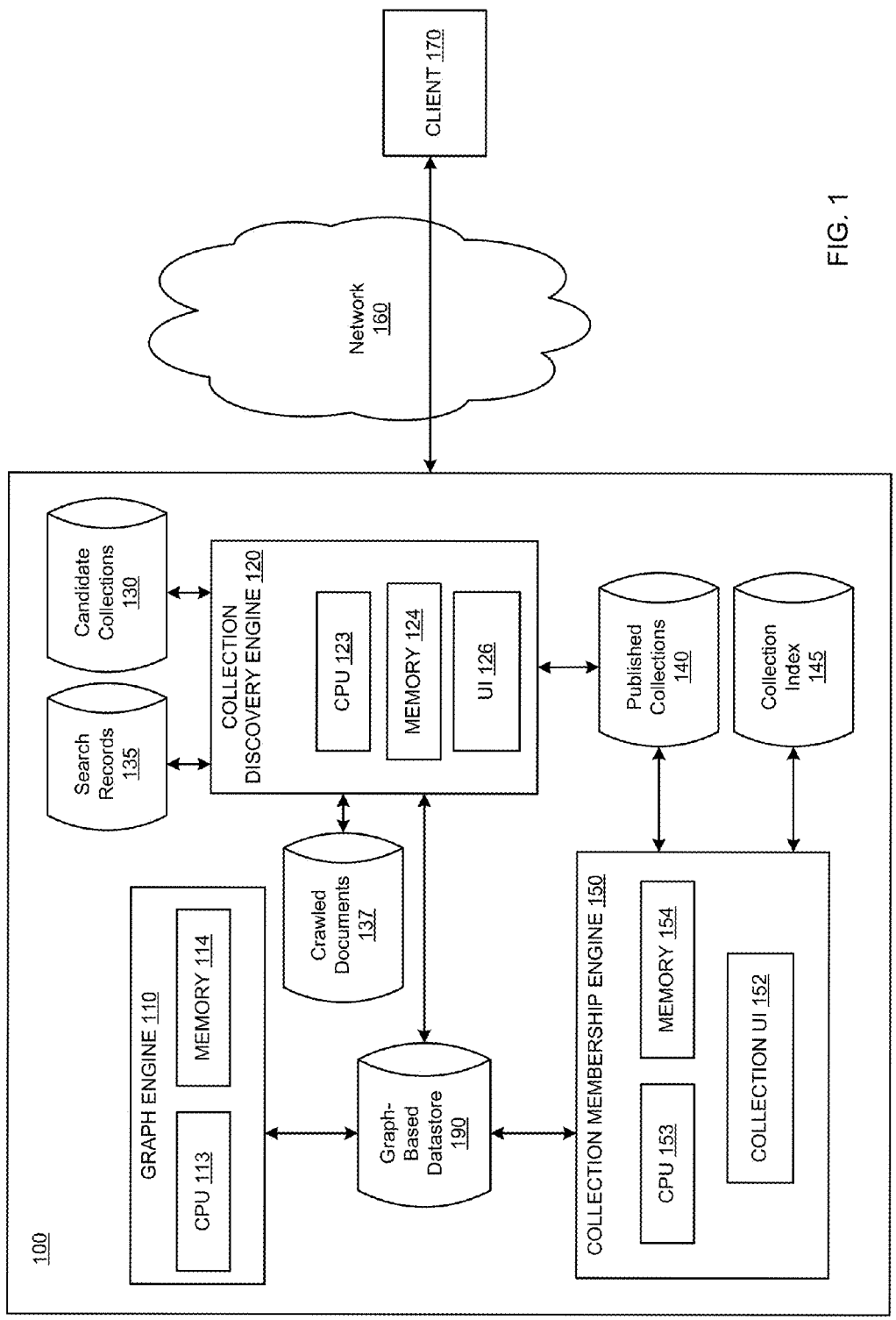
FIG. 1 illustrates an example system in accordance with some implementations.

FIG. 1 is a block diagram of a system 100 in accordance with an example implementation. The system 100 may automatically identify and define entity collections and efficiently determine membership of published collections from entities in a large data graph. The depiction of system 100 in FIG. 1 is described as a system capable of using search records, Internet sources, or user input to identify a group of potentially related entities, determine candidate collections, score, curate, and reconcile the candidate collections, and to identify collections of sufficient quality for publication. The system may include user-interface elements to facilitate user input. For published collections, the system may generate an index for the collections that allows the system to determine a particular node's membership in each published collection in one pass of the node's neighborhood. The system may generate collection entities in the data graph that represent the collection and the collection entity may have a special relationship with each node that is a member of the collection. Thus, the system may facilitate queries or analysis that takes advantage of the collection entities. The system of FIG. 1 is one example implementation and other configurations and applications may be used.

Figure 12:
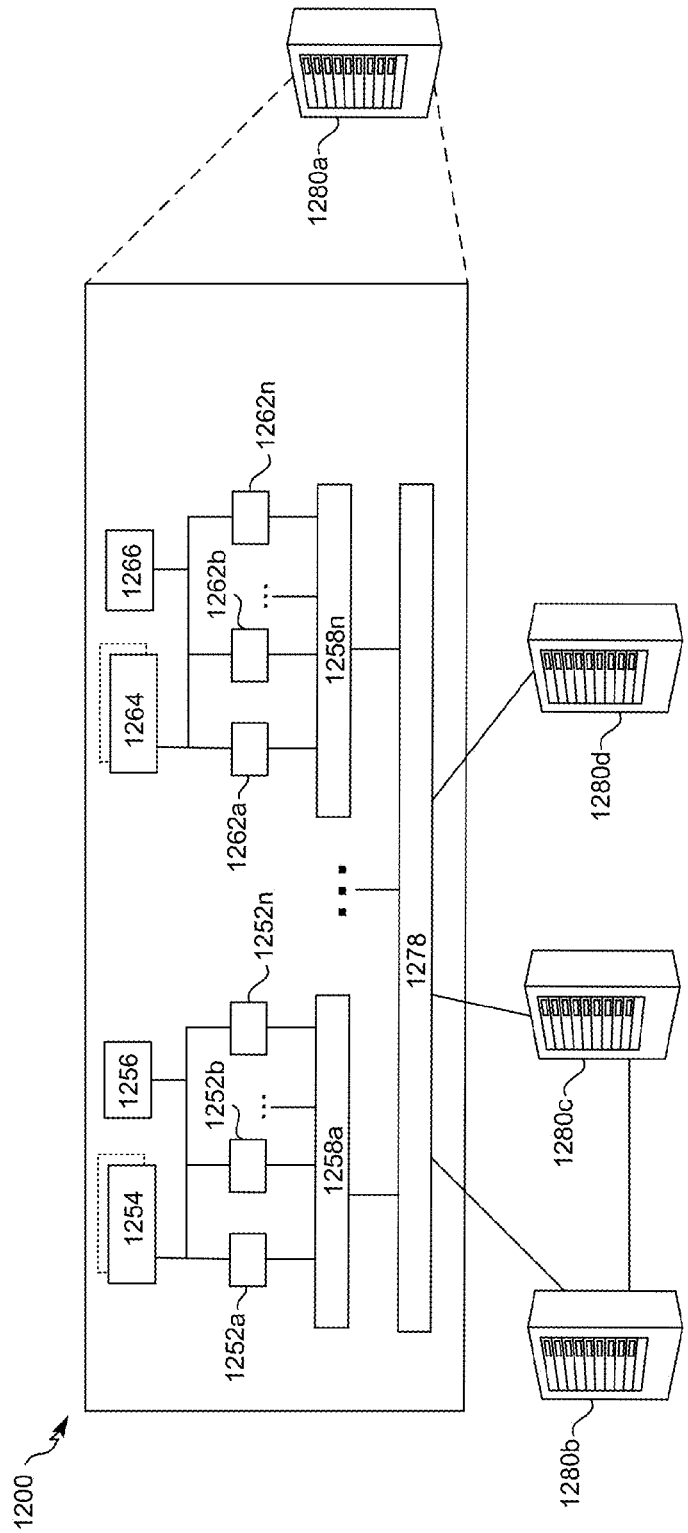
FIG. 12 shows an example of a distributed computer device that can be used to implement the described techniques.

The system 100 may include a graph engine 110, a collection discovery engine 120, and a collection membership engine 150. System 100 may be a computing system that includes a number of different devices, for example a standard server, a group of such servers, or a rack server system. In some implementations, graph engine 110, collection discovery engine 120, and collection membership engine 150 may each be a separate computing device, or they may share components, such as processors and memories. For example, the collection discovery engine 120, the graph engine 110, and the collection membership engine 150 may be implemented in a personal computer, a server, or one or more logical partitions of a computer. In some implementations, one or more of the collection discovery engine 120, the graph engine 110, and the collection membership engine 150 may be distributed systems implemented in a series of computing devices, such as a group of servers. The system 100 may be an example of computer device 1200, as depicted in FIG. 12.

The system 100 may include a graph-based data store 190. A graph-based data store is a data graph that stores information in the form of nodes and edges, with nodes being connected by edges. A node in a data graph may represent an entity, such as a person, place, item, idea, topic, abstract concept, concrete element, other suitable thing, or any combination of these. Thus, nodes may be referred to as entities and vice-versa. Entities in the graph may be related to each other by edges, which may represent relationships between entities. For example, the data graph may have an entity that corresponds to Abraham Lincoln and the data graph may have a has profession relationship between the Abraham Lincoln entity and a U.S. President entity and a Lawyer entity. An indexing engine may maintain the graph-based data store 190 to allow a search engine to search the data graph, for example finding entities related to other entities by one or more relationships or paths in the graph. In some implementations, the indexing engine may be included in graph engine 110. The graph-based data store 190 may include an index or some other method for searching for and retrieving data from the data store.

Figure 2:
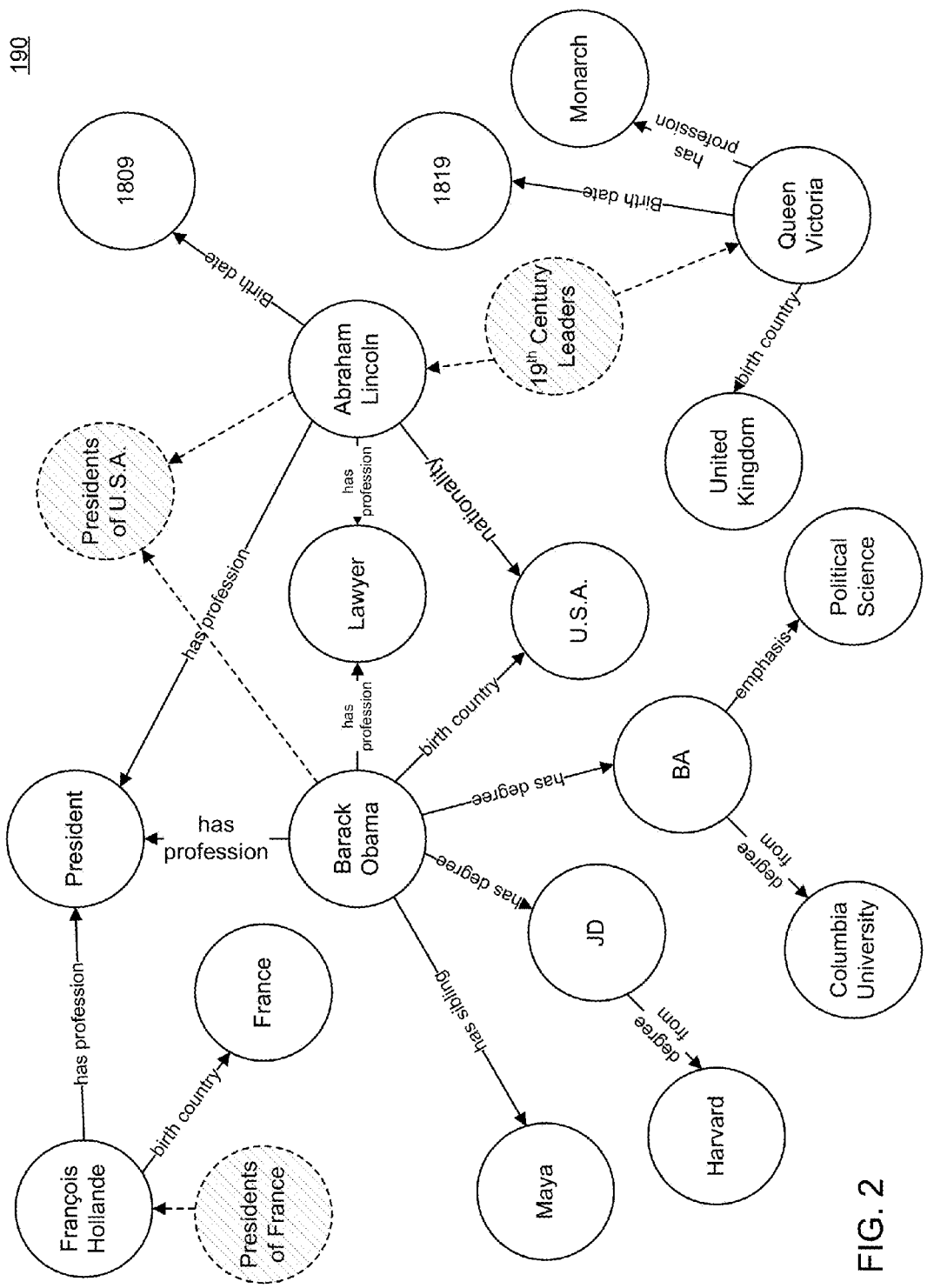
FIG. 2 illustrates a representation of a data graph, with entities as nodes and relationships as edges between nodes.

The graph-based data store 190 may include information from which a graph, such as the graph 200 illustrated in FIG. 2, can be created. As used herein, reference to a data graph may be considered reference to the index for the data graph and vice versa. The nodes of the data graph may be referred to as entities and the edges may be referred to as relationships between two entities. As used herein, entity may refer to a physical embodiment of a person, place, or thing or a representation of the physical entity, e.g., text, or other information that refers to an entity. For example, an entity may be the physical location of France or an abstract concept that refers to France. The graph engine 110 may include a user interface that allows users, for example users of client 170, to search, update, and otherwise maintain the information in the graph-based datastore 190. The graph engine 110 may be a separate computing device with its own processor 113 and memory 114, or it may share one or more processors and memories with other components of system 100.

The system 100 may include crawled documents 137. Crawled documents 137 may include an index for searching for terms or phrases within a corpus of documents. In some implementations, the corpus may be documents available via the Internet. Documents may include any type of file that stores content, such as sound files, video files, text documents, source code, news articles, blogs, web pages, PDF documents, spreadsheets, etc. In some implementations, crawled documents 137 may store one-dimensional posting lists that include phrases, terms, or document properties as posting list values and, for each posting list value, identifiers for documents related to the phrase or term. While an index for crawled documents 137 has been described as using posting lists, the index may have some other known or later developed format. Additionally, crawled documents 137 may be any collection of documents, including intranet repositories, documents associated with a particular server, etc.

The system 100 may also include search records 135. Search records 135 may include search logs, aggregated data gathered from queries, or other data regarding the date/time and search terms of previously processed queries. In some implementations, the search records 135 may be generated by a search engine (not shown) in the normal process of generating search results for queries executed against crawled documents 137.

The system 100 may also include candidate collections 130 and published collections 140. In some implementations, the candidate collections 130 and the published collections 140 may be the same data, and a flag or other field may determine whether the collection is published or not. Thus, collections 140 may be a subset of collections 130, and the two may not be distinctly stored collections. In some implementations, a candidate collection may be represented as a set of equivalent collections from different sources. Such a candidate collection may be associated with metadata from the different sources regarding the collection. A collection is defined as a series of conditions with constraints. The conditions, constraints, and other data, such as an identifier and name and metadata, are collectively a collection definition. The conditions and constraints that define a collection may represent conditions an entity in the graph-based data store 190 must satisfy to be a member of the collection. The collection definition may have one or more conditions in conjunctive normal form. This means that each condition must evaluate to true for an entity for the entity to be a member of the collection. A condition may represent a single constraint or a union or disjunction of two or more constraints. A constraint is associated with a path in the graph. The path often has a length of one, but may have a longer length. The constraint may be one of several types, and the type determines whether the path from a particular entity must exist, must not exist, must lead to a particular target node, must not lead to a particular target node, etc. A constraint may also be defined in terms of another collection. In other words, a constraint may specify that an entity must or must not be a member of some other collection.

Figure 3:
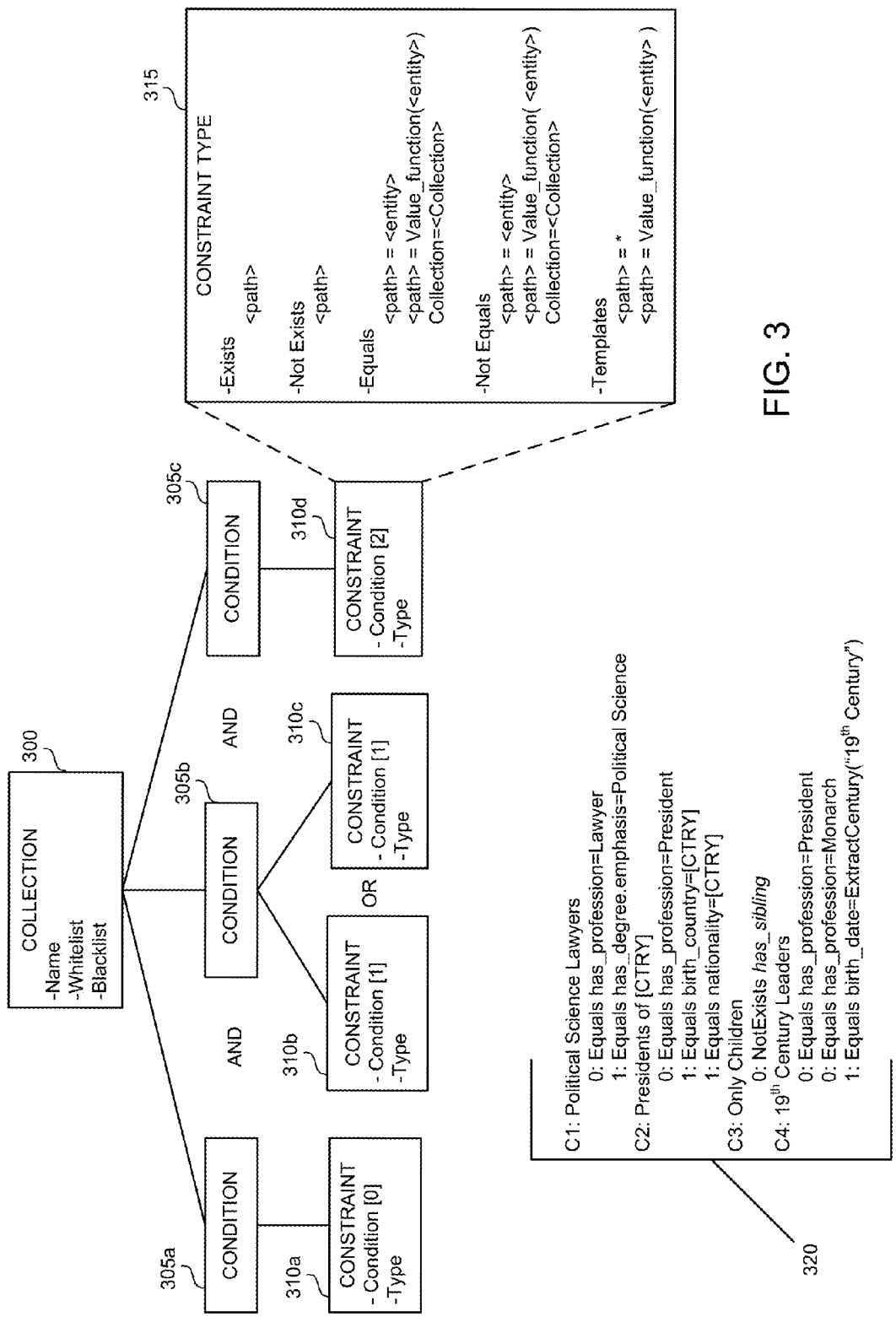
FIG. 3 illustrates an example of a flexible method for defining collections, consistent with disclosed implementations.

FIG. 3 illustrates an example of a flexible method for defining collections, consistent with disclosed implementations. The method includes a collection definition 300 with an identifier and a name that describes the collection. The name may be helpful for determining whether a collection is a good candidate for responding to a search query or in helping human curators arrive at a good name. In some implementations, the collection definition 300 may also optionally include a whitelist and/or a blacklist. The whitelist is a list of entities that are members of the collection regardless of whether a condition evaluates to false for those entities. The blacklist is a list of entities that are never members of the collection regardless of whether the conditions evaluate to true for those entities. The collection definition 300 may include one or more conditions 305, such as condition 305a, condition 305b, and condition 305c illustrated in FIG. 3. For an entity to be considered a member of the collection, the conditions 305a, 305b, and 305c must each evaluate to true for the entity. Thus, the conditions are in conjunctive normal form.

Each condition 305 has one or more constraints 310. In the example of FIG. 3, condition 305a has constraint 310a, condition 305b has constraints 310b and 310c, and condition 305c has constraint 310d. Each constraint 310 may have an associated constraint type 315. The constraint type 315 may be one of five types and may determine the format of the constraint expression for the constraint. A constraint expression may be a path in the data graph, a path-value pair, or a collection identifier, depending on the constraint type. The path may be a path of any length starting from the subject node. The value of a path-value pair may be a target node, e.g., the node that the path terminates at, or may be a template variable, or a value function applied to the target node.

For example, if the constraint type is Exists or Not Exists, the constraint expression may be a path. When a path is specified, the path must exist in the data graph, but the node the path ends at, e.g., the object node or the target node, is irrelevant. For example, if the path is has child, the system may only look for the has child relationship and may not care who the child is. For a type of Not Exists, the path must not exist in the data graph. As with Exists, it does not matter what the target node is. Thus, if the has child relationship does exist, this constraint would evaluate to false.

The Equals and Not Equals types are similar to the Exists and Not Exists types respectively, except that the constraint expression may be a path-value pair or a collection. When the constraint type is Equals and the constraint expression is a path-value pair, a path and a target entity are specified. For example, a constraint may specify that the path has profession must terminate in a lawyer node. Similarly, the collection may exclude all lawyers using the Not Equals constraint type with the same path and target entity. The constraint expression for the Equals and Not Equals constraint types may also include a value function to be applied to the target entity before evaluating the constraint. For example, a value function may take the value of a date entity and return the century, decade, year, or month of the date. This returned value may then be compared to the desired value. As an example, a value function may enable date entities to be grouped in buckets—for example "19$^{th}$ century" or "1970s." The value function may work on other types of entities. For example, a value function may convert states into countries or continents, another value function may convert zip codes into neighborhoods, another may convert dollars to euros, etc. Both the Equals and Not Equals types can specify a collection instead of a path-value pair for the constraint expression. In some implementations the constraint expression may use a keyword, e.g., 'collection', to indicate what follows the equal sign is a collection identifier. Thus, if there is a World Leaders collection, a constraint can specify membership in the World Leaders collection using the constraint expression "collection=World Leaders". This constraint would evaluate to true for an Equals type if the entity was a member of the World Leaders collection. If the constraint is a Not Equals type, the constraint evaluates to true if the entity is not a member of the World Leaders collection. This property allows the system to take advantage of recursiveness, resulting in more concise definitions while retaining flexibility in defining collections within the conjunctive normal form.

A constraint may also have a Template type. The Template type is similar to Equals, but instead of specifying the target node in the constraint expression, the constraint expression includes a template variable. The template variable allows the target node to determine which collection the entity belongs to. For example, a constraint with a Template type may have a constraint expression of has profession=[prof]. The [prof] represents a variable used to capture the target entity. The constraint identified above will generate a collection for has profession=Professor, another collection for has profession=Lawyer, another collection for has profession=Actor, etc. A collection definition may include two constraints, each of a Template type. For example, a second constraint of the collection above may have a constraint expression of nationality=[ctry]. This may result in one collection for French Lawyers, another for Chinese Professors, another for German Actors, another for USA Actors, etc. Additionally, when the same variable is used in constraints with an OR relationship, for example constraints 310b and 310c, different paths can use the same template variable. Thus, in the example above, a condition may have constraints that specify nationality=[ctry] OR citizenship=[ctry] OR born_in=[ctry]. Because the same template variable, [ctry], is used in each constraint, entities with nationality=USA and entities with born_in=USA will be placed in the same collection. In some implementations, when a variable is repeated, it is repeated across all constraints within a condition and is not repeated across conditions. The Template type may also use a value function to be applied to a target entity prior to evaluation. Thus, a constraint with a Template type that specifies a path of "birthdate=ExtractDecade([decade])" may generate a different collection for each decade encountered. It is understood that the format of the examples above is one example and other formats may be implemented in view of the disclosure above.

The Exists, Equals, and Template constraint types may correspond to constraints that represent inclusion because nodes with relationships and target nodes that meet the constraint expression satisfy the constraint. The Not Exists and Not Equals constraint types may correspond to constraints that represent exclusion because nodes with relationships and target nodes that meet the constraint expression do not satisfy the constraint.

Each constraint is associated with a condition. While a condition may have two or more constraints, the constraints associated with the same condition are disjunctive. This means that if any of the constraints are met, the condition is met. In the example of FIG. 3, constraint 310a is associated with condition 0 (305a), constraint 310d is associated with condition 2 (305c), and constraints 310b and 310c are both associated with condition 1 (305b). Thus, if either constraint 310b or constraint 310c evaluates to true, condition 1 evaluates to true. This will be illustrated later with regard to FIGS. 10A and 10B. In some implementations, conditions may be identified in order beginning with zero, although other condition identifiers may be used.

An example of four collections is illustrated as example collections 320. Example collections 320 may be published collections 140 or candidate collections 130. As the example collections 320 show, the length of the path of a constraint may be longer than one. For example, in the collection C1 with the name "Political Science Lawyers," a constraint in condition 1 has a path with a length of two. In that constraint, a particular node meets the constraint when it has a relationship of has_degree with some intermediate node, and the intermediate node has a relationship of emphasis that leads to a political science node. Thus, as illustrated a path for a constraint may have a length greater than one. Collection C2 illustrates a collection with a Template constraint type. Because the Template type generates multiple collections, the name of the collection includes the variable that determines collection membership. Thus, the name of the C2 collection is "Presidents of [CTRY]" where [CTRY] is replaced with the value of the target node from the constraint in condition 1. As illustrated, condition 1 of C2 has two constraints. Thus, collection C2 can use either a birth country relationship or a nationality relationship to define the value of the [CTRY] variable. Collection C3, which has a name of "Only Children," illustrates a collection with only one condition and one constraint within the condition. Collection C4 illustrates the use of a value function. The constraint in position one extracts the century from the value of the target node prior to comparing it to the value "$19^{th}$ Century". It is assumed that the function ExtractCentury( ) will return that value if the date entity related to the node by the birth_date relationship is between 1800 and 1899.

Figure 8:
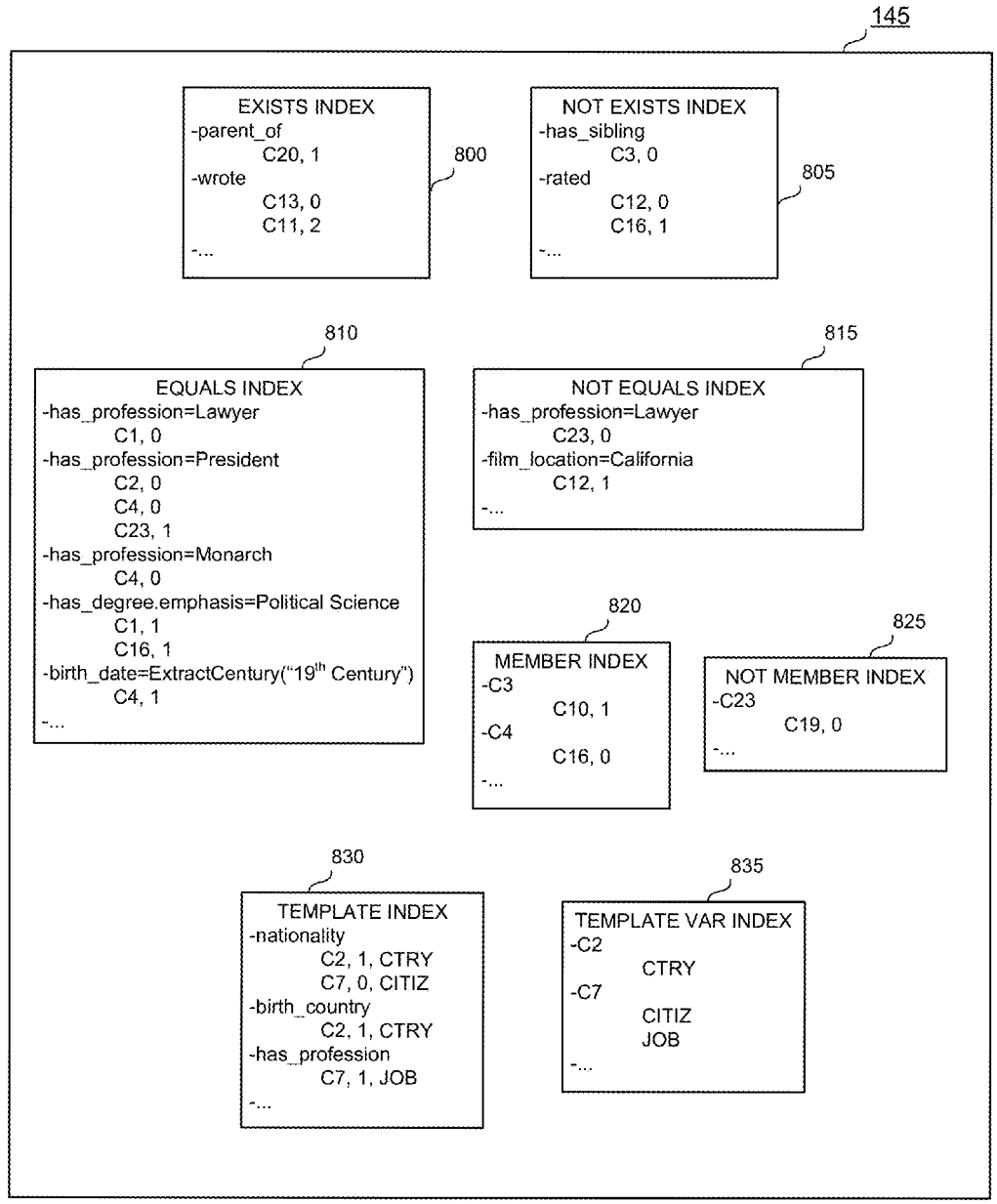
FIG. 8 illustrates an example index of collection constraints, consistent with disclosed implementations.

Returning to FIG. 1, the system 100 may include collection index 145. The collection index 145 may enable the system to traverse the neighborhood of an entity in one pass while still determining the entity's membership in each collection in the published collection 140. The index 144 may include an index for each type of constraint. The indices for the Exists and Not Exists types may specify the path and the collection/condition pair (or in other words, the collection/position pair) associated with the path. The indices may be sorted by path or by a hash of the path. The indices for the Equals and Not Equals types may specify for each path/target node pair a collection/condition pair. The Equals and Not Equals indices may be generated from Equals and Not Equals condition constraints that are not collection identifier and not templates. The indices for the Member and Not Member types (e.g. constraint expressions that identify a recursive collection), may specify for each matched collection a corresponding collection/condition pair. The index for the Template type (e.g., constraint expressions that include a template variable) may specify for each path a corresponding collection, condition, and template variable. The collection index 145 may also include a mapping from a collection to a list of template variables used in the collection. The collection index 145 may also include other mappings needed to efficiently generate entity memberships for a large data graph. FIG. 8 illustrates an example of the collection index 145.

The graph-based data store 190, crawled documents 137, search records 135, candidate collections 130, published collections 140 and collection index 145 are stored on tangible computer-readable storage devices, for instance disk, flash, cache memory, or a combination of these, configured to store data in a semi-permanent or non-transient form. In some implementations, the graph-based data store 190, crawled documents 137, search records 135, candidate collections 130, published collections 140 and collection index 145 may be stored in a combination of various memories, and/or may be stored in a distributed manner across multiple physical or logical computing devices.

In some implementations, the system 100 may include a collection discovery engine 120. The collection discovery engine 120 may include one or more processors 123 configured to execute one or more machine executable instructions or pieces of software, firmware, or a combination thereof to automatically define collections and to facilitate user curation of collections and/or collection names. The collection discovery engine 120 may have its own processor and memory or it may share one or more processors and memories with other components of system 100. To automatically generate candidate collections 130, the collection discovery engine 120 may analyze search records 135 and/or crawled documents 137, as will be explained in more detail below. The collection discovery engine 120 may also allow a user, such as a user of client 170, to select a set of entities from the graph-based data store as a basis for generating collections. In some implementations, the collection discovery engine 120 may also permit a user, for example using user interface 126, to directly define collections, to edit automatically generated candidate collections 130, to add entities to the white or blacklists of a collection, and to publish one or more candidate collections 130 to published collections 140. In some implementations, the collection discovery engine 120 may automatically select one or more of the candidate collections 130 for publication to published collections 140. As explained above, publishing a candidate collection 130 may include setting a flag that indicates whether a collection is published or may include actually moving the collection definition from candidate collections 130 to published collections 140. In some implementations, the collection discovery engine 120 may include a ranking engine that ranks and evaluates candidate collections 130 for publication. The collection discovery engine may also include a reconciliation engine that evaluates the candidate collections for duplicates, synonyms, etc., and merges compatible collections.

In some implementations, the system 100 may include a collection membership engine 150. The collection membership engine 150 may include one or more processors 153 configured to execute one or more machine executable instructions or pieces of software, firmware, or a combination thereof to generate the collection index 145 from the published collections 140. The collection membership engine 150 may have its own processor and memory or it may share one or more processors and memories with other components of system 100. The collection membership engine 150 may generate the collection index 145 periodically, for example once per day. In some implementations, the collection membership engine 150 generates the index 145 in an offline mode. The collection membership engine 150 may also use the graph-based data store 190 to determine entity membership in the published collections 140. The collection membership engine 150 may determine an entity's membership in a single pass of the entity's neighborhood, evaluating each edge one time for all constraints, using the index 145. In some implementations, the collection membership engine 150 may generate a new entity, referred to as a collection entity, in the data graph to represent each published collection and each collection generated from template constraints. The collection entities may be linked in the graph to the entities that are members of the collection by a relationship that indicates membership in a collection. In some implementations, the collection membership engine 150 may determine entity membership and generate the collection entities on a periodic basis, for example once per day. In such an implementation the collection membership engine 150 may delete any collection entities and the relationships representing entity membership, generate collection entities for collections in the published collections 140, evaluate the nodes in the data graph for membership, and generate the proper relationships. In other implementations the collection membership engine 150 may generate a collection entity when the collection is published and may generate entity memberships at the time the collection is published and for individual entities as the entity or its relationships are changed, e.g. added, deleted, or otherwise updated. In some implementations, the system may generate collection membership in response to a query or other command. The query may identify the entity and, optionally, the neighborhood of the entity to be evaluated.

The system 100 may also include other components not illustrated for brevity. For example, the system 100 may include an indexing engine to create and maintain graph-based data store 190 and/or crawled documents 137, etc. The indexing engine may obtain content from, for example, one or more servers, and use the content to maintain graph-based data store 190 and/or crawled documents 137. In some implementations, the servers may be web servers, servers on a private network, or other document sources that are accessible by the indexing engine. The indexing engine may be one or more separate computing devices, such that graph-based data store 190 is maintained by a first set of computing devices and crawled documents 137 is maintained by a second set of computing devices, etc. For example, the graph engine 110 may include an indexing engine for the graph-based data store 190 and the system 100 may include another indexing engine for crawled documents 137. The system 100 may also include a search engine that use the graph-based data store 190 and/or crawled documents 137 to determine search results for queries using conventional or other information retrieval techniques.

The system 100 may be in communication with the client(s) 170 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the collection discovery engine 120 or the collection membership engine 150 may communicate with and transmit data to/from clients 170. For example, collection discovery engine 120 may provide candidate collections for curation to users of clients 170 and users of clients 170 may define collections, publish collections, or update candidate collections.

Automatically Defining Collections

Figure 4:
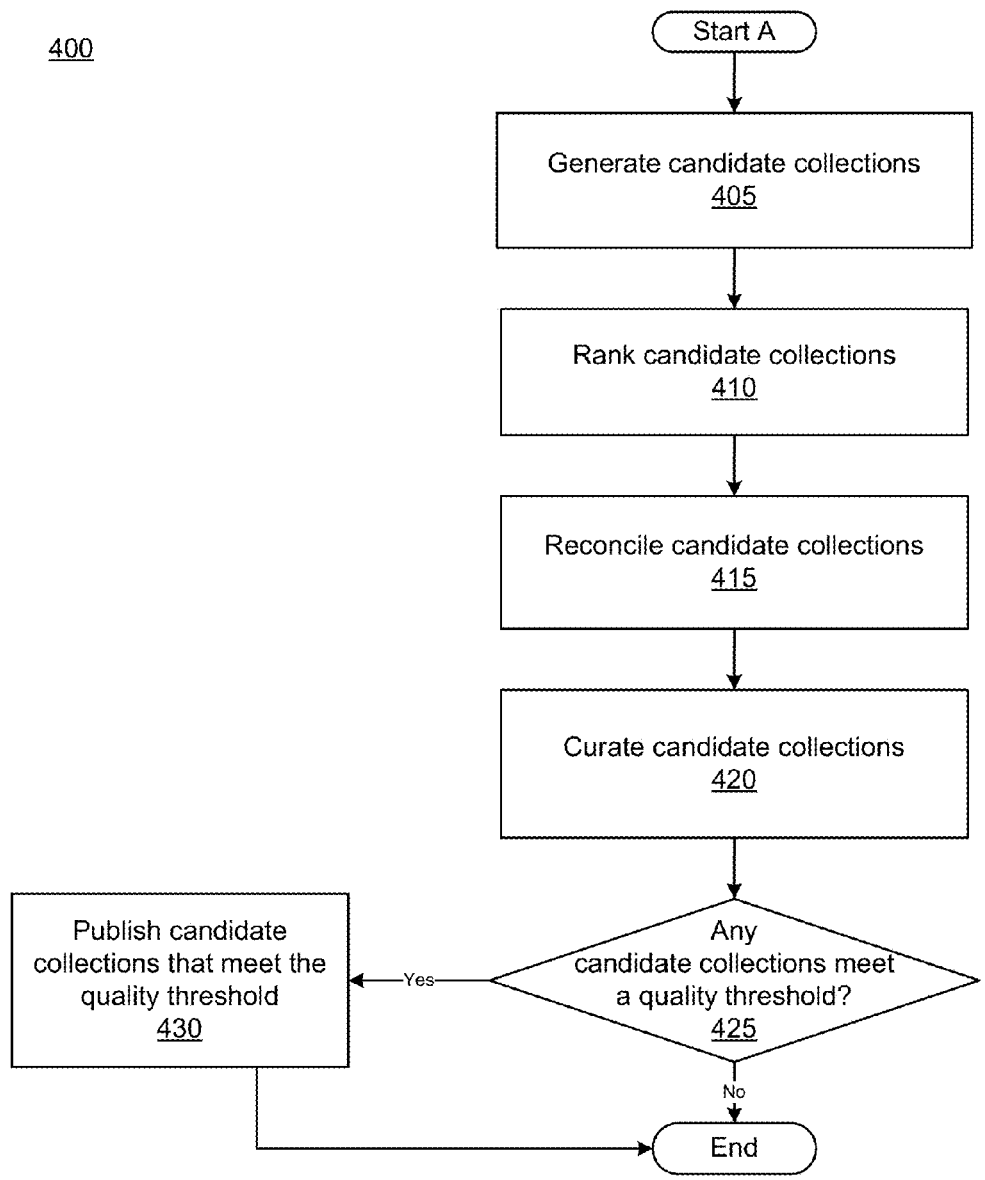
FIG. 4 illustrates a flow diagram of a process for generating published collection definitions, consistent with disclosed implementations.

FIG. 4 illustrates a flow diagram 400 of a process for generating published collection definitions, consistent with disclosed implementations. The process 400 may be performed by a system, such as system 100 of FIG. 1. The system may use process 400 to automatically generate, rank and reconcile candidate collections, and automatically or semi-automatically curate the candidate collections. In some implementations, the system may also automatically publish candidate collections that meet a quality threshold. The quality threshold may be based on several factors, as explained below. In some implementations, process 400 may be performed by a collection discovery engine.

Process 400 may begin with the system generating candidate collections (405). The candidate collections may be automatically generated from analysis of search records or collaborative documents, such as wiki pages, or from user-provided entities from a data graph. Collaborative documents, such as wiki pages, are documents edited by many people and can represent group consensus regarding the description of a topic. The system may use heuristics and meta rules to determine which collections are important, as will be explained in further detail with regard to FIG. 5 below. Other sources of candidate collections include Web Tables. Web tables are tables found in a document available over the internet and may be generated using the <table> tag in Hypertext Markup Language (HTML) or other similar markup. In the Web tables example, entities listed together in a table may be considered a set of entities for analysis.

Figure 6:
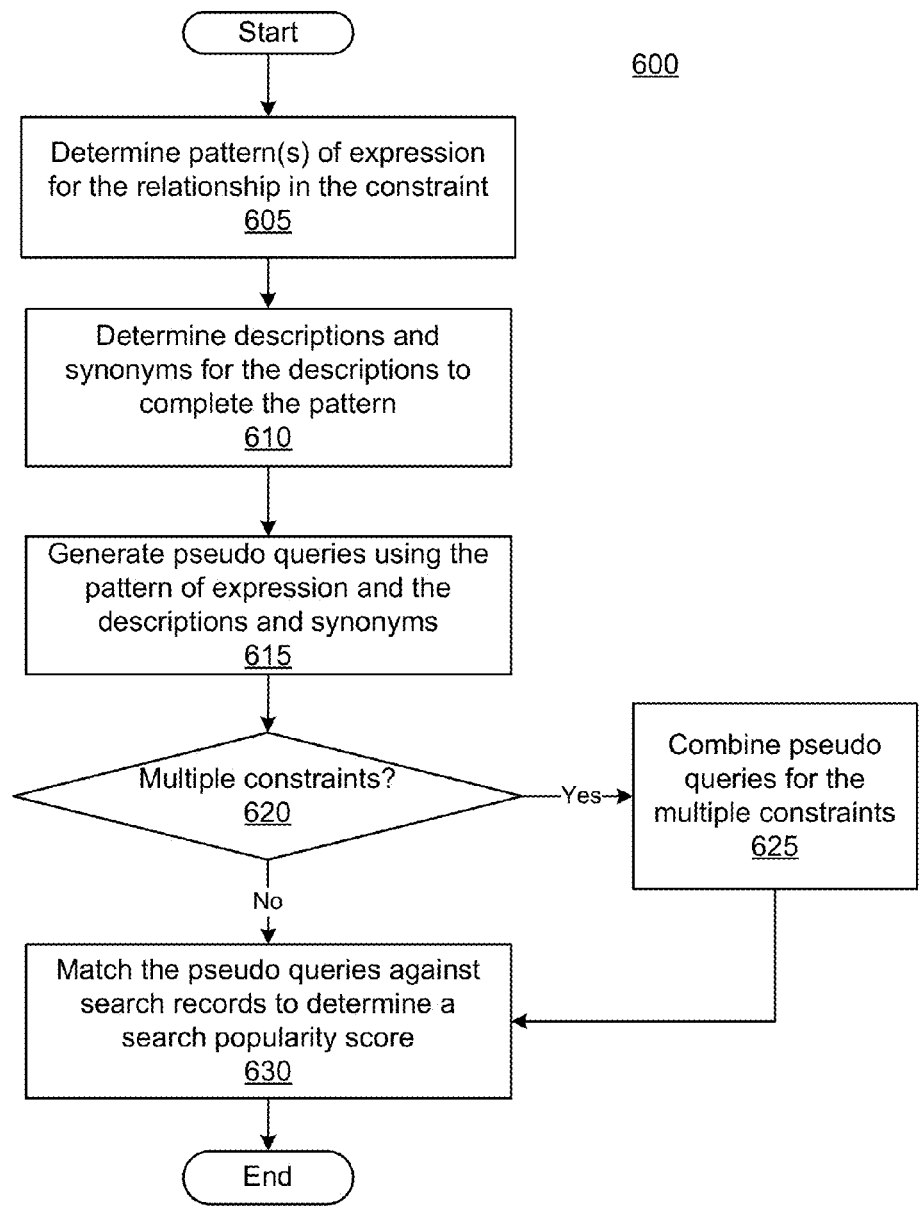
FIG. 6 illustrates an example of a process for determining a search popularity score for a candidate collection based on search records, consistent with disclosed implementations.

Once the system has identified candidate collections, the system may rank the candidate collections (410). Ranking the candidate collections may include assigning an importance/popularity score to each candidate collection. This score may be used to determine a quality score and/or to prioritize the collection for a manual curation process. The system may generate scores based on search record signals, member entity notabilities, or other signals and may aggregate the scores into an overall score. The aggregated score may be a weighted sum of the individual scores. FIG. 6 illustrates an example of generating a search score based on search record signals. A member score based on member entity notabilities may represent the number of important or popular entities in the collection. The importance of each entity may be based on an importance score kept in the data graph for each entity or the importance score for each entity from an engine that matches entities in the data graph to references of that entity in documents, such as web pages. In some implementations, the member score may be an average importance score, or may be a percentage of entities in the collection that have an importance score that meets a threshold. In some implementations, the system may also consider a table importance score based on how often the entities of the collection appear in tables or lists in documents available over the Internet or in some other document corpus. For collections that have entities that appear in tables and/or lists in documents of a corpus, the system may determine how often the entities appear in the tables/lists, how similar the entities in the collection are to the table/list, and if the collection is very similar to a table/list, the quality the document having the table/list. For example, the system may determine a PageRank of the document, may determine how often the table/list was imported by users, etc. Other types of scores may be considered in determining a rank score for the candidate collection.

The system may aggregate the individual scores, e.g., the search popularity score, the member score, and the table importance score, to determine an overall rank score. The overall rank score may be a weighted sum of the individual scores. For example, some implementations may weigh the search popularity score higher, while other implementations may weigh the member score higher. Collections with higher overall rank scores may be considered first for manual name curation. The system may also use the rank score to determine a quality score for automatic publication.

The system may also reconcile candidate collections (415). Collections that are compatible may be merged. Collections are compatible when they are equivalent or nearly equivalent. One way collections are compatible is when the constraints are identical for two candidate collections. When constraints are identical, the system may automatically merge the two candidate collections into a new candidate collection. Candidate collections may also be compatible when the constraint of one collection is a source constraint for a target constraint of another collection. To identify target-source relationships, the system may include a table or other data that maps a target constraint to one or more source constraints. For example, a source constraint may be "album release type=live album" and its target constraint may be "album content type=live album." As another example, a target constraint may be "book genre=social science" and its source constraints may include "consumer product category=social science books" During reconciliation, the system may translate each source constraint into the target constraint. Then the system may determine that candidate collections include the same translated constraints and merge the two collections. In some implementations, when the definitions are merged, the system assigns the target-source constraints to the same condition, so that either constraint may be satisfied to satisfy the condition.

In some implementations, the collections are compatible when the constraints are equivalents. In such an implementation, the system may include a table of relationships or constraints that are synonyms of each other for the purpose of collection definition. For example, born in may be a synonym of nationality, has profession=author may be a synonym of wrote, and played instrument X on an album may be a synonym of played instrument X in a band. The system may translate each constraint that has a synonym into a condition with a series of disjunctive constraints, each constraint representing a synonym in the table. If one candidate collection with translated constraints is then found to be equivalent to another candidate collection with translated constraints, the system may merge the two collections, keeping the condition with the disjunctive constraints. The two candidate collections that were used to generate the new candidate collection may be deleted. When two candidate collections are merged, the system may calculate a rank score for the new merged collection based on the rank scores of the two candidate collections. The rank score for the new collection may be an average of the rank scores of the two candidate collections, the higher of the rank scores of the two candidate collections, or the system may generate a new rank score as described with regard to step 410 above. Of course, in some implementations, the system may merge candidate collections before generating a rank score for the candidate collections, rearranging the order of the steps shown in FIG. 4.

The system may also curate the candidate collections (420). Curation refers to determining a name for the collection. In some implementations, the system may automatically generate one or more suggested names for the candidate collection. The automatically generated name may be used in a quality score for the candidate collection, may be used to suggest names to a human contributor, etc. The system may use heuristics applied to the properties of the relationship-value pairs in the constraints to suggest names. For example, if a constraint includes a relationship and a value, such as profession=Jazz Pianist, the system may use the plural form of a description for the target entity as a name for the collection, e.g. Jazz Pianists. Some relationships in the data graph have a schema. For example, a constraint of plays instrument=violin may result in a suggested name of 'violin player" but this is awkward. The plays instrument relationship may have a schema with a description of "musician." The system may use the schema to generate the suggested name "violin musicians." This may be especially helpful when a predicate has more than one property, such as mediator or compound value type predicates in the Freebase data graph.

The system may also use a description of the relationship as a potential name. For example, if the constraint specifies a path of parent of the suggested name may be "parents." This may be helpful when the constraint is of the Exists type.

If the collection definition has multiple conjunctive constraints, the system may combine the descriptions chosen for each constraint. For example, if one constraint is profession=Jazz Pianist and another is citizenship=France, the system may suggest "French Jazz Pianists." In some implementations, the name may be based on an expected type. For example, entities in the collection may be of a single entity type. The entity type (e.g., Movie or Person) may be used to name the collection. The system may also infer names may also be induced from categories of collaborative web pages, such as wikis, or class names for queries used to generate the collection candidates. More than one suggested name may be generated for an entity. The system may choose one of the names as the collection name and the remainder may be aliases. The generated name may be used to calculate a name score for the collection. Names with digits may be considered low quality names and be associated with a low name score. Collections with a high number of aliases may also be considered to have a lower quality name, as there are a number of different possibilities and it may be beneficial to have a human curator select a name for the collection. Collections with human-curated names may be considered to have high quality names with a high name score. Thus, it is possible that a collection that does not meet a quality threshold for publication with automatically generated names may meet the threshold after human curation. In some implementations, a candidate collection may never meet the quality threshold before a human curator has approved the collection name.

The system may determine whether candidate collections meet a quality threshold (425). Each candidate collection may have a quality score that is compared to the quality threshold. The quality score may be a combination of the rank score, for example from step 410, a name score from step 420, and/or other factors. In some implementations, the system may use natural language techniques to analyze the name of a collection to determine whether it correlates to the entities. For example, if the name of the collection is "Chinese Scientists," for example taken from a category of a wiki, but the entities in the collection are not person entities, the system may not consider the candidate collection to be of high quality. Because the current name is misleading, the candidate collection may need a human contributor to curate the name of the candidate collection before the system determines it meets the quality threshold.

The system may also use filters to filter out bad quality candidates regardless of the rank score, name score, or other scores. For example, the system may filter out candidate collections that have a size less than a minimum size, collections with more than a maximum quantity of equivalent collections, candidate collections with less than a minimum quantity of constraints, and/or candidate collections where the fraction of entities in the collection is less than a minimum fraction of entities. In some implementations, candidate collections that do not meet the filters may be deleted, or may be assigned a very low quality score. In some implementations, the filtering may take place during the generation of candidate collections, as discussed below with regard to FIG. 5. If a candidate collection meets the quality threshold (425, Yes), the system may publish the candidate collection (430). Published collections may then be indexed and membership automatically determined as described below with regard to FIGS. 7-10. Process 400 then ends. It is understood that the steps of process 400 may occur over some period of time for particular candidate collections. For example, some candidate collections may be automatically published without human curation, while others may receive curation before they are published. Such candidate collections may wait in a queue for curation for a period of time. The queue may use the rank score or quality score of a candidate collection, so that more highly scored collections may be curated first. Ranking, reconciling, and curating the candidate collections may be performed independently of each other and may be performed in any order.

Figure 5:
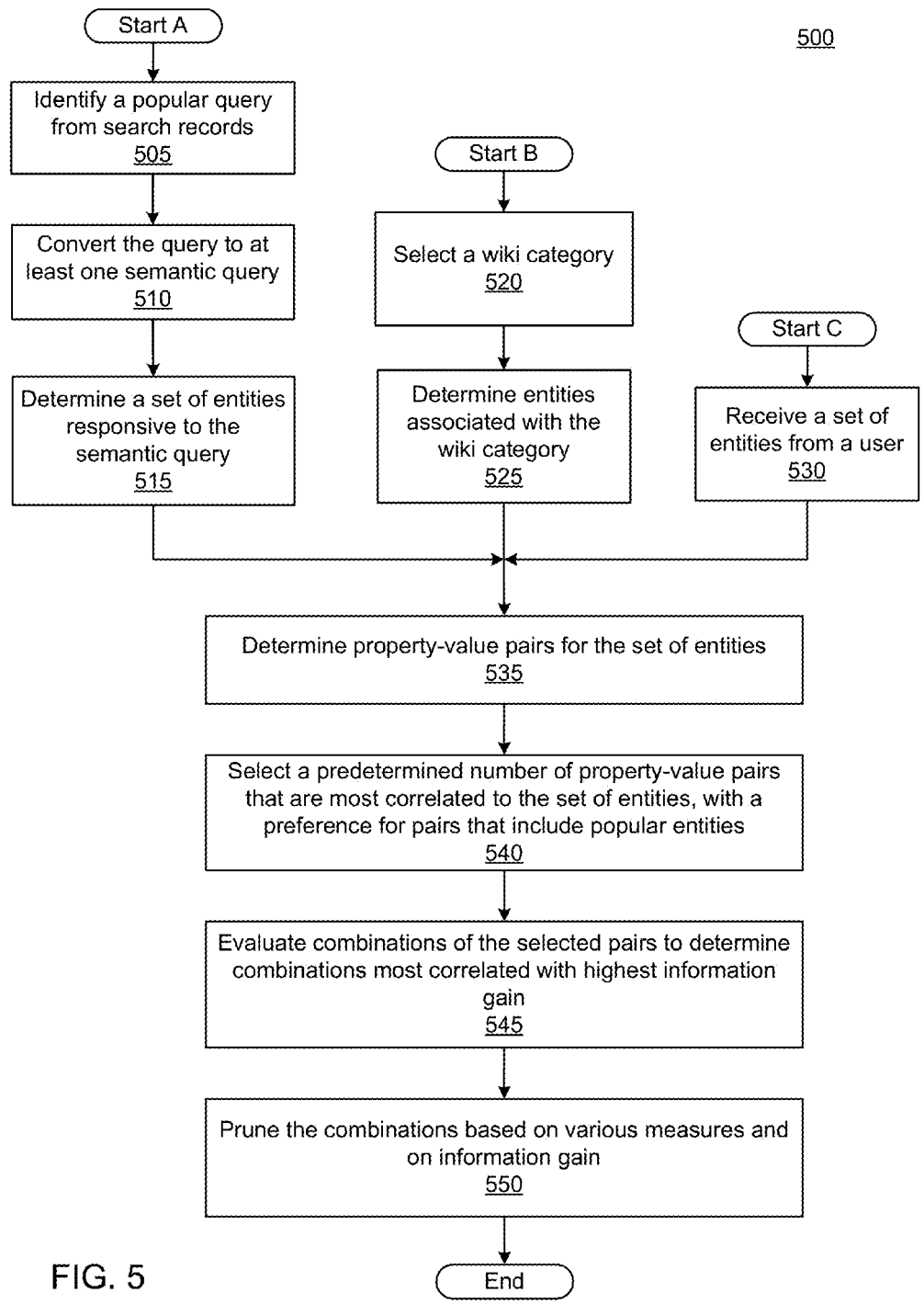
FIG. 5 illustrates an example of a process for automatically generating candidate collections, consistent with disclosed implementations.

FIG. 5 illustrates a flow diagram 500 of a process for automatically generating candidate collections, consistent with disclosed implementations. The process 500 may be performed by a collection discovery engine of a system as part of step 405 of FIG. 4. The system may use process 500 to automatically discover common properties shared by entities in a set of entities, and to determine which common properties are important and candidates for defining a collection. Process 500 may start using one of a number of inputs. For example, in one implementation process 500 may begin by identifying a popular query from search records (505). In some implementations, a popular query may be a query requested with regularity or a query frequently requested in a given timeframe. An example of a popular query is "Tom Hanks movies." The system may convert the natural language query into one or more semantic queries that can be executed against a data graph (510). The conversion may be accomplished using natural language analysis, analysis of the semantic graph, or other known or later developed techniques. For example, the natural language query "Tom Hanks Movies" may be converted into a query for "films Tom Hanks acted in" or "movies Tom Hanks produced" or "films Tom Hanks directed," etc. The system may execute each of the semantic queries against the data graph to determine a set of entities responsive to the query (515). Each semantic query may result in a corresponding set of entities. While FIG. 5 illustrates examining one set of entities for one semantic query for brevity, it is understood that step 515 and 535 to 550 may be performed for each semantic query and, thus, each semantic query may result in one or more candidate collections.

In another example, process 500 may begin by selecting a category from a collaborative site, such as a wiki site. Wiki sites may include a document describing an entity, and may associate the entity with one or more categories. The system may use one of the categories and determine which entities in the data graph are associated with the category (535). In another example, the system may simply receive a set of entities from a user (530). In some implementations, the system may include each entity specified by the user in a whitelist for the collection. In some implementations, the system may analyze the set of entities received from the user as described below to determine a definition that can be used to group other entities into the collection. In other words, the entities supplied from the user may represent a sample of entities for a collection.

Once the system has a set of entities, the system may determine property-value pairs for the entities in the set (535). Property-value pairs represent a path and target node shared by a plurality of entities in the set. Because a large data graph may have thousands or hundreds of thousands of properties to evaluate, in some implementations, some properties, i.e. relationships, may not be considered for property-value pairs. For example, some relationships may model graph meta-data, including data about entity types and properties, some properties may be known to be rare, if the distribution of the values for the property fail to satisfy some criteria, such as an entropy threshold or having literal values such as floating point numbers, dates, integers, etc. The system may ignore such properties. In addition, the system may ignore paths that lead to some types of target entities. For example, the system may ignore nodes that are compound value types (CVTs), nodes without natural language names, etc. The system may use information technology theory based metrics to measure how strongly correlated the property-value pair is with the set of entities and select a predetermined quantity of the property-value pairs (540). For example, to determine a correlation statistic the system may use information gain and IF-IDF measures, or any other known or later developed correlation statistic. The correlation statistic may account for entity popularity, so that property-value pairs that include more popular entities receive an increase to the correlation statistic score. Entity popularity may be tracked in the data graph. Once each property-value pair has a correlation statistic, the system may select the top 4-5, or some other predetermined quantity, of the property-value pairs for further evaluation The system may evaluate combinations of the selected property-value pairs to determine which combinations are most correlated to the set of entities and have the highest information gain (545). For example, the system may determine subsets of the set of selected property-value pairs and evaluate each subset with a size less than or equal to a predetermined quantity, for example 3. As an example, if the predetermined quantity is 3 and the system has selected four property-value pairs for further evaluation, P1, P2, P3, and P4, the system may generate subsets of the group {P1, P2, P3, P4} that have between 1 and 3 members. In other words, the system may generate the subsets: {P1}, {P2}, {P3}, {P4}, {P1, P2}, {P1, P3}, {P1, P4}, {P1, P2, P3}, {P1, P3, P4}, {P1, P2, P4}, {P2, P3}, etc. Each subset represents a candidate collection. For each subset, the system may calculate an information gain. The system may prefer simpler collections, or in other words collections with fewer constraints. For example, if the collection {P1, P2, P4} has the same information gain, or same common entities, as the collection {P1, P4}, the system will prefer {P1, P4} over {P1, P2, P4} as P2 does not add value to the collection. In some implementations, the information gain may be based on the total number of entities in the data graph, the number of entities in the set of entities, the number of entities in the data graph that meet the constraints of the subset, and the number of entities in the set that meet the constraints of the subset. Table 1 below illustrates example values for the variables described above for a data graph with 1,000,000 entities. It is understood that for the sake of brevity, Table 1 does not include values for every subset combination and that the system would calculate the values for the additional subsets to determine information gain for each subset:

TABLE 1

| Subset | Total Entities (T) | Total Entities in Set (S) | Total Entities in Subset (Y) | Entities from the Set in the Subset (X) |
| --- | --- | --- | --- | --- |
| {P1} | 1,000,000 | 70 | 3500 | 44 |
| {P2} | 1,000,000 | 70 | 6500 | 37 |
| {P1, P2} | 1,000,000 | 70 | 1500 | 33 |
| {P1, P3} | 1,000,000 | 70 | 500 | 15 |

The system may use the above values to calculate entropy of the subset, for example, using the formula $H(a,b)=(-a \log a)-(b \log b)$, where $a=S/T$ and $b=(T-S)/T$. The system may also calculate the distribution of entities satisfying the subset (e.g. $Y/T$) and not satisfying the subset (e.g. $(T-Y)/T$). These calculations may be used to calculate the information gain of a subset. For example, the information gain for a subset may be represented by the entropy of the subset (described above) minus the fraction of entities satisfying the subset multiplied by H(X, (Y−X)) minus the fraction of entities not satisfying the subset multiplied by H((S−X),(T−Y−S+X)).

The system may select subsets with an information gain that meets a predetermined threshold. Of the candidate collections that meet the threshold, the system may use other measures to prune the collections (550). For example, candidate collections that do not meet a size threshold may be discarded, or definitions where the fraction of entities satisfying the collection definition is less than a fraction threshold may be discarded. Other similar types of measures may be used. The system may store candidate collections that are not pruned and meet the information gain threshold as candidate collections. The property-value pairs may become the constraints of the candidate collection. Thus, at this point, candidate collections have one to three conditions, each condition having one constraint. Process 500 may then end, having generated candidate collections.

FIG. 6 illustrates an example of a process 600 for determining a search popularity score for a candidate collection based on search records, consistent with disclosed implementations. The process 600 may be performed by a collection discovery engine of a system as part of step 410 of FIG. 4. The system may use process 600 to calculate a search popularity score used to determine an overall rank score for a candidate collection. The search popularity score may one of several scores used to determine the overall rank score. The system may begin process 600 by determining a pattern of expression for the relationship in the constraint of a candidate collection (605). The pattern of expression may be a learned pattern based on the relationship and the types of entities it connects. For example, if the collection includes a constraint of actor=Tom Hanks the system may know that the actor relationship links a movie, play, or TV show to a person. The system may determine that the pattern of expression for the actor relationship is "<person> <media>" or "<media> <person>" or "<media> of <person>" or "<media> <person> acted in", etc.

The system may then determine descriptions and synonyms of the description for the relationship, and the target entities or the entity type of the expected subject for the relationship (610). For example, films, shows, and pictures may be synonyms of movies, musicals may be a synonym of play, and episode may be a synonym for TV show. The actor relationship may expect a media type as the subject entity and a person as the object entity. The synonym determination may include synonym determination used in conventional search systems to offer alternative queries for a search. The system may use these descriptions and synonyms to generate at least one pseudo query (615). For example, the pseudo queries for the example above may be "tom hanks movies" "tom hanks films," "shows starring tom hanks," etc. If there are multiple constraints (620, Yes), the system may perform steps 605 to 615 for each constraint and combine the pseudo queries (625). Thus, for example, if the candidate collection in the example above has an additional constraint of rated=PG, the system may combine the pseudo queries into "pg rated movies by tom hanks".

The system may match the pseudo queries against search records to determine popularity/importance evidence with which to determine a search popularity score for the candidate collection (630). As discussed above with regard to FIG. 4, the search records may include an indication of quantity, frequency, and recency of previously submitted search queries. If the pseudo queries match a query in the search records, the system may use a popularity score for the query to determine a search popularity score for the candidate collection. In some implementations, the system may aggregate or average the scores from matching queries. In some implementations, the search records may be annotated with references to entities in the data graph. This may help disambiguate ambiguous strings in the pseudo queries or search records. In some implementations, the system may also use other records, such as frequency of a term in a corpus, to determine the search popularity score. For example, some systems may index phrases of one or more words, such as "action movies" and the number of documents that include the phrase may be an indication of popularity as well. Process 600 ends when the system has determined a search popularity score for the candidate collection.

Determining Collection Membership

Figure 7:
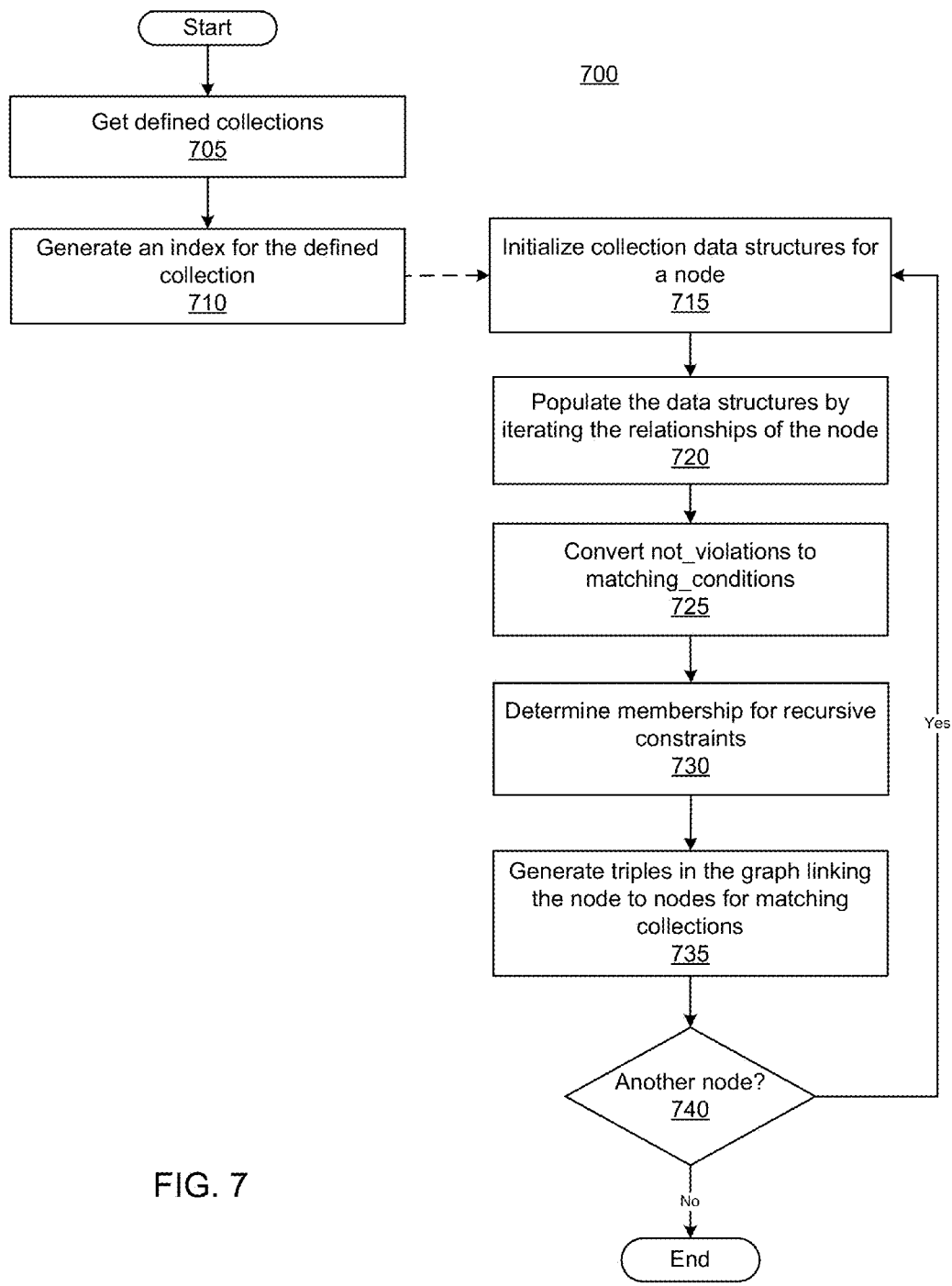
FIG. 7 illustrates an example process for efficiently determining entity membership in collections, consistent with disclosed implementations.

FIG. 7 illustrates an example process 700 for efficiently determining entity membership in collections, consistent with disclosed implementations. The process 700 may be performed by a collection membership engine of a system such as system 100 of FIG. 1. The system may use process 700 to generate indexes for published collections and use the indexes to determine entity membership in each collection. The system may begin process 700 by obtaining defined collections (705). The collections may be automatically defined collections, for example using process 400 of FIG. 4, and/or collections entered by a user. In some implementations, a user may also edit an automatically generated collection. Defining collections may be an ongoing process, with collections being automatically generated on a periodic basis and entered or updated manually at any time. The collections may be kept in a library, such as published collections 140 of FIG. 1. The system may generate an index of collection constraints from the collections (710). The index may include several indices that the system uses to determine an entity's membership in a single pass of the neighborhood. The index generation may be done on a periodic basis, for example nightly, so that new collections and modifications to collections may be captured by the index. In some implementations, the index may be updated when a collection is published or modified.

FIG. 8 illustrates an example index of collection constraints, consistent with disclosed implementations. As illustrated, the index may include a plurality of constraint-type based indices. Each constraint in the collection library may be inserted into one of the constraint-type indices. For example, the index may include an Exists index 800 for constraints of the type Exists. This index may map the constraint expression from the Exists constraints with a path as the constraint expression to the collection/condition pair associated with the constraint. The index may also include a Not Exists index 805. This index may map the constraint expression from the Not Exists constraints to the collection/condition pair associated with the constraint expression. In the example illustrated in FIG. 8, the relationship parent_of is used in a constraint for the second condition (condition 1) of collection C2, the relationship wrote is used in a constraint for the first condition of collection C13 and the third condition for the collection C11. The Not Exists index illustrates that the has_sibling relationship appears in the first condition of the C3 collection. This collection is illustrated in the example collections 320 of FIG. 3.

The index may also include an Equals index 810 for constraints with an Equals constraint type. The Equals index 810 may specify a constraint expression for constraints of the Equals type and the collection/condition pairs associated with those constraints. Thus, for example, index 810 includes separate entries for has_profession=Lawyer and has_profession=President because the constraint expression includes the target node. The index 810 may include paths of any length, such as the has_degree.emphasis=Political Science entry and may include a value function, as illustrated by the birth_date=ExtractCentury ("$19^{th}$ Century") entry. The index may also include a Not Equals index 815 for constraints of the Not Equals constraint type. The Not Equals index 815 may function similar to that of the Equals index 810, mapping a constraint expression to collection/condition pairs. However, this index indicates that the path to the target node should not exist in the data graph for the constraint to be met.

The index may also include a member index 820 and a not member index 825. The index 820 and the index 825 represent constraints with a collection identifier as the constraint expression. The member indices specify membership in (for index 820) or no membership in (index 825) other collections. Thus, index 820 and index 825 map a collection to a collection/condition pair. For example, the second condition of collection C1 has a constraint that specifies membership in collection C3. Thus, for this constraint to be true, the node being evaluated must be a member of collection C3. Likewise, index 825 illustrates that the first condition of collection C19 specifies that an entity must not be a member of collection C23. The Member index 820 and Not Member index 825 represent recursive collection constraints.

The index may also include Template index 830 and Template Variable index 835. The Template index 830 maps a constraint expression to a corresponding collection, condition, and template variable. When a node is evaluated for membership, if the node has a path matching the path in the constraint expression of template index 830, the system can determine which collection/condition pairs that path belongs to. The system may then use the target node at the end of the path to determine which collection the node belongs in, as will be explained in more detail with regard to step 735 below. The Template Variable index 835 may map a collection to a list of template variables in the collection. The system may use the index 835 to generate the collections after analyzing the neighborhood of the node, as explained in more detail with regard to step 735 below.

Returning to FIG. 7, the system may use the index to determine an entity's membership in the published collections (715-740). This may be done independently of defining collections and generating the index, although the index must be generated prior to determining an entity's membership. The system may determine an individual entity's membership as part of a process that determines membership for all entities in the data graph or the system may determine the entity's membership when an entity has been modified, e.g. a relationship added or deleted in the data graph. In some implementations, the system may delete all collection nodes and relationships for the collection nodes before determining membership for the entities in the data graph. Determining membership may cause the system to regenerate collection entities and their relationships as explained in more detail below.

At 715 the system may initialize collection data structures for a node. The data structures may include a collection conditions data structure that tracks which conditions in which collections the node has satisfied. In some implementations, the collection condition data structure may be a bit vector and the node may have a bit vector for each collection. The bit vector may contain the collection as key with a flag, e.g. a bit or byte or position in an array, for each condition in the collection. For example, the collection C1 illustrated in examples 320 of FIG. 3 may have a collection condition data structure for C1→00, with each 0 representing one of the two conditions in collection C1. Collection C2 of FIG. 3 may also have a data structure such as C2→00 and collection C3 may have a data structure of C3→0. It is understood that the collection condition data structure may take various forms so long as it includes the collection as the key and flags or bits indicating whether each condition in the collection is met. The system may initialize the collection condition data structures so that no conditions are met in any collections. For example, when a bit vector is used, the bits representing the conditions may be initialized to zero. The system may also initialize additional data structures. For example, the system may generate a Template Matching Value data structure that maps template variables to target nodes encountered during the walk of the node's neighborhood. Thus, for example, when a nationality path leads to a target node of U.S.A., the system may associate U.S.A. with the template variable [CTRY] from collection C2. The system may initialize the Template Matching Value structure to an empty structure. Additionally, the system may have a violation data structure for each constraint that has a Not Exists index or Not Equals constraint type. The violation data structure may include an entry for each entry in the Not Exists index 805 and the Not Equals index 815. The system may initialize the violation structure to indicate that no violations were found.

The system may then populate the data structures by iterating the neighborhood of the node (720). Iterating the neighborhood is completed in one pass as explained in more detail below with regard to FIG. 9. After iterating the neighborhood, the condition collection data structures include an indication of which conditions have been satisfied by Equals, Exists, and Template constraints. The system may then update the collection condition data structures with information from the violations data structure. For example, when the violations data structure indicates a condition was not violated, the system may set the corresponding flag or bit in the collection condition data structure to indicate the condition was met. Any violations are not returned, as their corresponding flag or bit in the collection condition data structure was originally set to "not met."

The system may also determine membership for recursive constraints (730). The system may use the Member index and the Not Member index to further modify the collection condition data structure. For example, the system may determine the collections specified as keys in the Member index, determine whether the node is a member of that collection using the collection condition data structure, and if it is, set bits or flags in the corresponding collections/condition pairs for the collection specified in the key. For example, using the Member index 820 of FIG. 8, the system may determine if a node is a member of collection C3, for example if all condition bits or flags for collection C3 are set to true. If it is, the system may set the bit or the flag for C10 condition 1 to true. Similarly, using the Not Member index 825, the system may determine if the node is a member of collection C23 and if not, the system may set collection C19 condition 0 to true.

The system may then generate triples in the data graph representing node membership (735). For example, the system may generate a relationship between the node and a collection entity representing a collection that the collection condition data structure for the collection indicates has all conditions met. If an entity representing the collection does not exist, the system may add it. The entity Presidents of U.S.A. in FIG. 2 illustrates an example of a collection entity. The collection entity may have an identifier assigned by the system and a name, which is the name of the collection. The relationship between the collection entity and other entities in the graph may be a special relationship that signifies membership in a collection.

For collections that include a template constraint, the system may use the Temporary Matching Value data structure to identify those collections and to generate the correct relationships. As indicated above, the Temporary Matching Value data structure maps a collection and template variable to a matching value. The Template Variable index, such as index 835 of FIG. 8, indicates how many template variables exist in a collection. The system may generate a Cartesian product of the values for the variables of a collection. For example, collection C7 of FIG. 8 has two template variables. If the Temporary Matching Value data structure for collection C7 has the values "French" and "German" for the variable [CITIZ] and has the jobs of "Actor," "Writer" and "Tailor" for the [JOB] variable, the system may generate the combinations of "French Actor" "French Writer", "French Tailor", "German Actor" "German Writer" and "German Tailor". These combinations each represent a collection. Thus, the entity that populated the Temporary Matching Value data structure is a member of six collections. Accordingly, the system may generate a relationship between the entity and each of the six collection entities, and generate any of the six collection entities that did not previously exist in the data graph. If there are other nodes with memberships to be determined (740, Yes), the system may repeat steps 715 through 735 for the next node. If no other nodes have memberships that need to be determined (740, No), process 700 may end.

Figure 9:
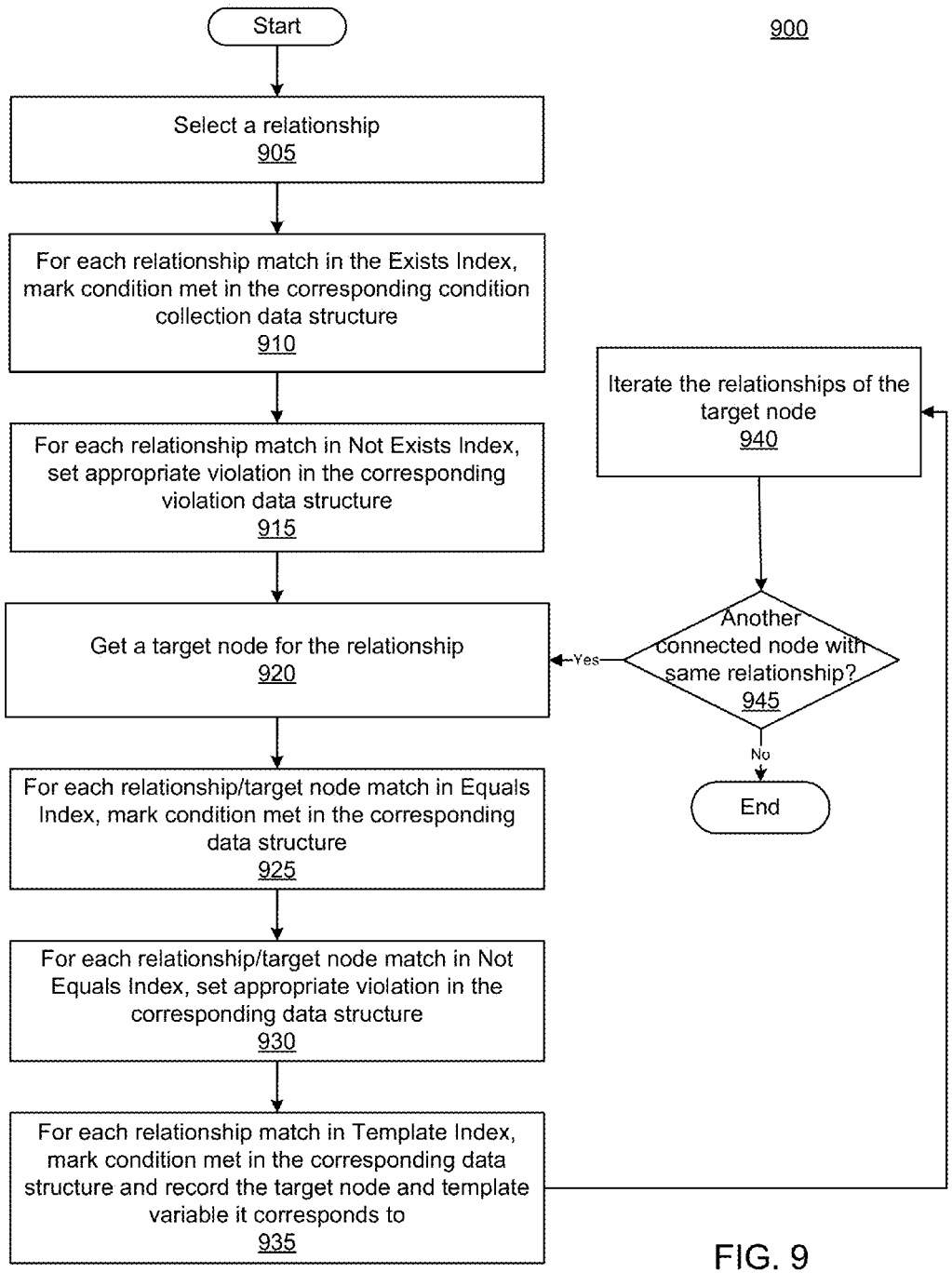
FIG. 9 illustrates an example process for iterating the neighborhood of a node to determine collection membership in one pass, consistent with disclosed implementations.

FIG. 9 illustrates an example process 900 for iterating the neighborhood of a node to determine collection membership in one pass, consistent with disclosed implementations. The process 900 may be performed by a collection membership engine as part of step 720 of FIG. 7. The system may begin process 900 by selecting one of the relationships in the neighborhood of the node (905). The relationship may be any relationship that directly connects the node with another node. The system may compare the relationship to the Exists index (910). If the Exists index includes a path matching the relationship, the system may determine the collection/condition pairs for the path in the Exists index. For each collection/condition pair, the system may mark the corresponding bit in the collection condition data structure (or flag etc.) to condition met. The system may also compare the relationship to the Not Exists index (915). If the relationship matches a path in the Not Exists index, the system may determine the collection/condition pairs associated with the path in the Not Exists index. For the associated collections, the system may set the associated conditions as violated in the violations data structure.

The system may then get the target node for the relationship (920). The target node is the node connected to the original node by the relationship. The system may compare the relationship and target node combination to the constraint expressions in the Equals index (925). If the Equals index includes a matching path and target node, the system may determine the collection/condition pairs associated with the path and target node in the Equals index. For the associated collections, the system may set the indicated conditions as met in the condition collection data structure. The system may also compare the relationship and target node combination to the Not Equals index (930). If a matching path and target node are found, the system may determine the collection/conditions pairs associated with the matched path-value pair. For each associated collection, the system may set the associated conditions to violation found in the violation data structure. The system may also compare the relationship to the Template index (935). If the relationship matches the path from a constraint expression in the Template index, the system may determine the collection, condition, and template variables associated with the matching path. For each associated collection the system may mark the associated condition as met in the collection condition data structure. For each associated collection the system may also generate an entry in the Temporary Matching Value data structure that maps the associated collection and template variable from the constraint expression with the target node.

The system may then iterate the neighborhood of the target node, concatenating the relationship with the relationships of the target node (940). In other words, the system may perform process 900 for the target node, but each relationship from the target node to another node is concatenated with the relationship leading from the original node to the target node. Thus, for example, if the original relationship is has_degree and the target node is JD and the JD node has a degree from relationship to Harvard, the relationship used to match the indices is has_degree.degree_from. This allows the collection definitions to include paths with a length longer than one. Thus, relationship as used in FIG. 9 may refer to a path length longer than one on a second iteration. In some implementations, the system may limit the number of iterations. For example, if the target node would be the fourth iteration, the system may skip step 940. In this example, only paths with a length of three are used in constraints.

When the system has iterated the neighborhood of the target node, the system may determine whether there is another target node that has the same relationship with the original node (945). If another target node does exist (945, Yes), the system may repeat steps 920 to 945 using the next target node. If there are no other target nodes (945, No), this iteration is complete and process 900 ends.

Figure 10A:
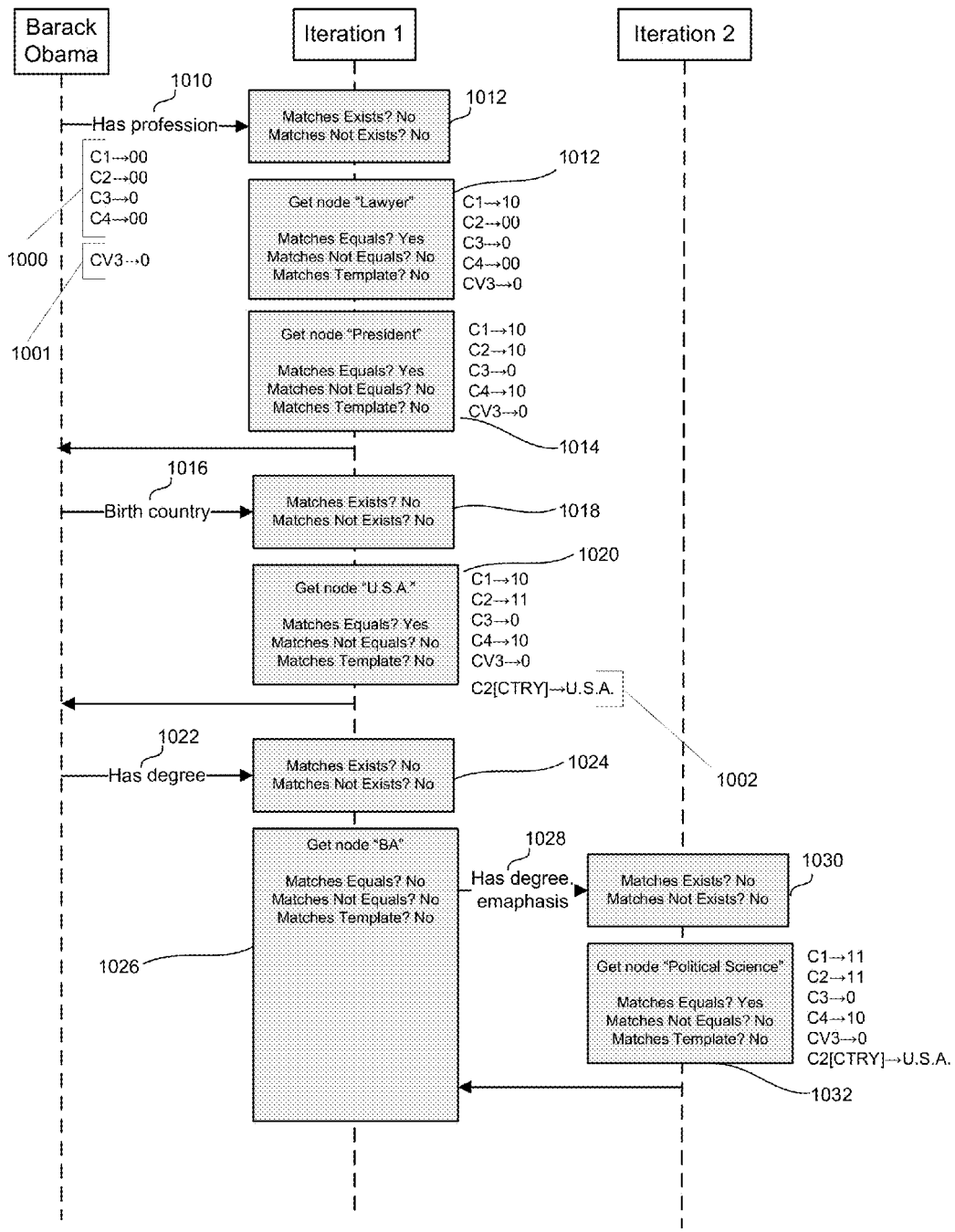
FIGS. 10A and 10B illustrate an example of iterating the neighborhood of a node, using the data graph of FIG. 2, the example collections 320 of FIG. 3, and the example indices of FIG. 8.
Figure 10B:
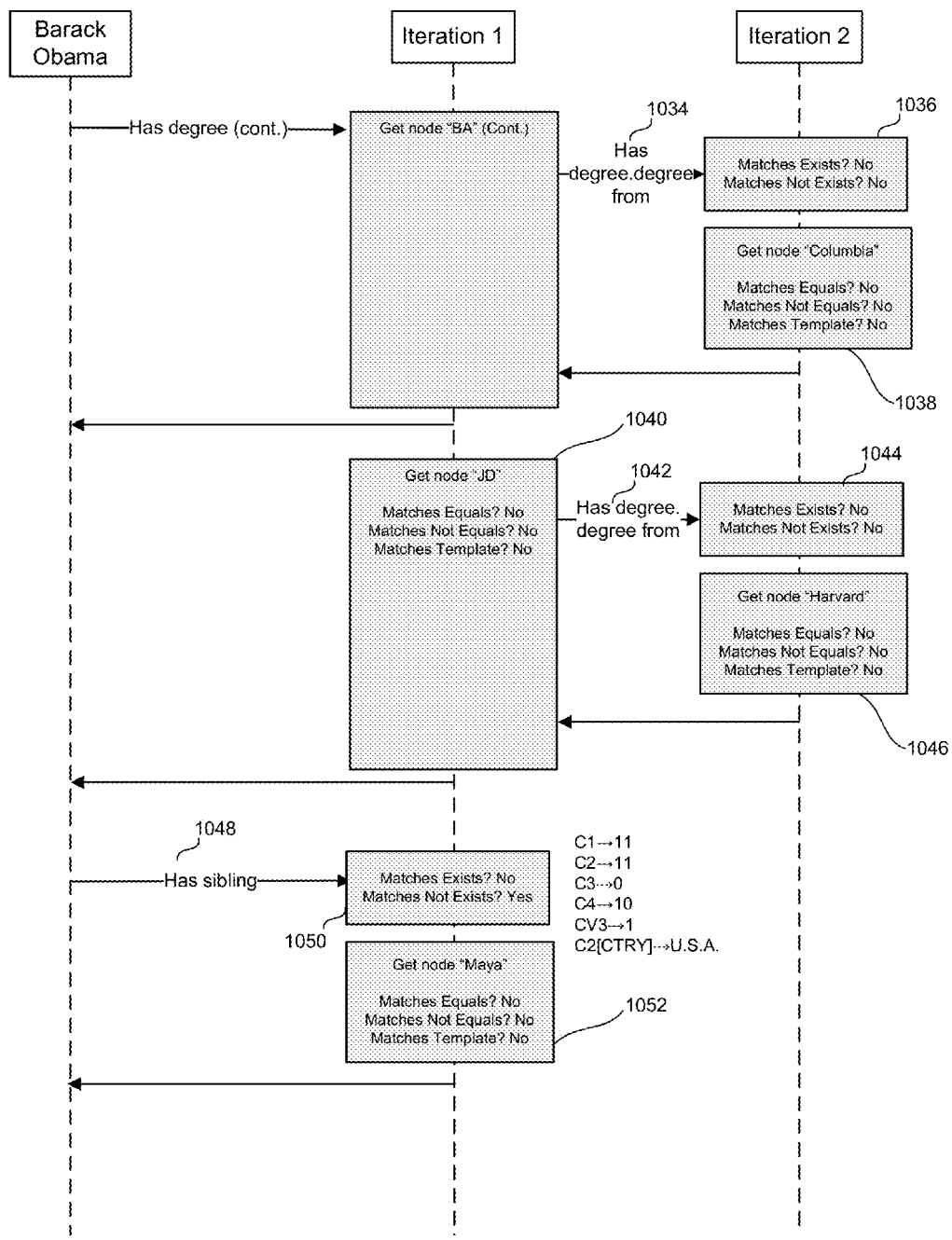

FIGS. 10A and 10B illustrate an example of iterating the neighborhood of a node to determine collection membership using the data graph of FIG. 2, the example collections 320 of FIG. 3, and the example indices of FIG. 8. For the sake of brevity only index entries relating to collections C1 to C4 of the example collections 320 of FIG. 3 are considered for this example. In the example of FIGS. 10A and 10B the Barack Obama node of FIG. 2 is the node being evaluated, and may be referred to as the original node. The system may generate a collection condition data structure 1000 for each of the collections C1, C2, C3, and C4 of FIG. 3. The system may also generate a violation data structure 1001 for the condition of the C3 collection, as it includes a Not Exists constraint. For this example, the data structures will be referred to as having flags to represent the conditions of the collections, but it is understood that the flags may be bits, numbers, characters, or any other method used to track a condition met/not met state. All flags in the data structures may be set to the not met state, in this example all zeros. The system may select a relationship for the Barack Obama node, such as the has profession relationship (1010). The system may then compare the has profession relationship to the Exists index 800 and Not Exists index 805 (1012). Neither index includes the has profession relationship, so the data structures remain unchanged. The system then looks at the target node, in this example Lawyer (1014) and compares the combination of has profession=Lawyer to the Equals index 810, the Not Equals index 815, and the Template index 830. Collection C1, condition 0 matches the relationship and target node combination in the Equals index 810, so the system sets the flag corresponding C1 condition 0 to condition met, in this example a 1. The combination of has profession=Lawyer does not have a match any other indices, so the system may analyze the next target node of the has profession relationship, the President node (1014). The combination of has profession=President matches an entry in the Equals index 810, so the system determines from the index 810 that collection C2 condition 0 and collection C4 condition 0 are met. The system sets the appropriate flags in the collection condition data structure 1000 to condition met. The combination does not match any other index entries and no other target nodes exist for the has_profession relationship, so the system selects another relationship.

The system selects the birth country relationship (1016) and determines whether that relationship appears in the Exists index 800 or the Not Exists index 805 (1016). It does not, so the system looks at the target node of U.S.A. (1020). The system looks for the combination birth country=U.S.A. in the Equals index 810, the Not Equals index 815, and the Template index 830. The system finds a match in the Template index 830 for collection C2 condition 1 (1020). The system sets the corresponding flag in the collection condition data structure 1000 to condition met and generates an entry in the Temporary Matching Value data structure 1002 mapping the C2 template variable [CTRY] to U.S.A. As illustrated in FIG. 10A, the C2 collection now has met both conditions, as indicated by both condition flags having the condition met value. Because no other target nodes have the birth country relationship, the system selects another relationship.

In the example of FIG. 10A, the system selects the has degree relationship next (1022). The system compares this relationship to the Exists index 800 and the Not Exists index 805 (1024). No matches are found. The system then obtains a target node for the relationship, selecting the BA node (1026). The system looks for the combination has degree=BA in the Equals index 810, the Not Equals index 815, and the Template index 830. No matches are found. The neighborhood of the BA node is then inspected by selecting the emphasis relationship of the BA node (1028). Inspecting the neighborhood of the BA node is a second iteration, so the emphais relationship is concatenated to the has degree relationship of the first iteration. This concatenated path becomes the relationship the system compares to the constraint expressions in the indices. The system first looks for a has degree.emphasis path in the Exists index 800 and the Not Exists index 805 (1030), but no matches are found. The system then looks at the target node for the emphasis relationship, the Political Science node (1032). The system looks for the has degree.emphasis=Political Science combination in the Equals index 810, the Not Equals Index 815, and the Template index 830. The system finds a matching entry in the Equals index 810 for C1 condition 1. Accordingly, the system sets the corresponding flag in the collection condition data structure 1000 to condition met. As illustrated, the C1 collection now has all its conditions met. The Political Science node has no further relationships to explore, so the system looks at the next relationship for the BA node, which is illustrated in FIG. 10B.

In FIG. 10B, the system selects the degree from relationship of the BA node next (1034). Because this is a second iteration, this relationship is concatenated with the relationship of the first iteration and the system looks for has degree.degree from in the Exists index 800 and the Not Exists index 805 (1036). No matches are found. The system then gets the target node Columbia of the degree from relationship of the BA node (1038). The system compares the has degree.degree from=Columbia combination to the Equal index 810, the Not Equals index 815, and the Template index 830. No matches are found.

The system has explored the neighborhood of the BA node and, thus, returns to the first iteration looking for another target node for the has degree relationship. Another node is found (1040). The system compares the combination has degree=JD to the Equals index 810, the Not Equals index 815, and the Template index 830. No matches are found. But the JD node has a neighborhood to explore, so the system iterates its neighborhood. The system concatenates the degree from relationship to the has degree relationship and looks in the Exists index 800 and the Not Exists index 805 for entries matching has degree.degree from (1044). No matches are found. The system gets the target node Harvard and looks in the Equals index 810, the Not Equals index 815, and the Template index 830 for has degree.degree from=Harvard (1046). No matches are found.

At this point the system has explored the neighborhood of the JD node, and the original node Barack Obama has no more target nodes with the has degree relationship. Therefore the system may select the next relationship has sibling (1048). The system may look in the Exists index 800 and the Not Exists index 805 for the has sibling relationship (1050). The Not Exists index 805 has a match for collection C3 condition 0. Because the match is with the Not Exists index 805, the system does not set the corresponding flag in the collection condition data structure 1000. Instead, the system sets the corresponding flag in the violations data structure 1001 to condition violated, in this case a 1. Tracking Not Exists and Not Equals in this manner ensures that if the constraint with the Not Exists type is part of a disjunction in the condition (e.g., only child or oldest child), the condition can still be met by the other constraint in the condition. The system may then get the target node Maya and determine whether the has sibling=Maya combination is in the Equals index 810, the Not Equals index 815, or the Template index 830 (1052). No matches are found there, and all relationships for the Barack Obama node have been analyzed, so the system has completed its iteration of the neighborhood.

Before the system can determine memberships for the Barack Obama node, the system may use the violation data structure 1001 to set additional flags in the collection condition data structure 1000. For example, if the condition for collection C3 was not marked as a violation, the system may set the flag for collection C3 condition 0 to condition met. However, because a violation was found, the system does not change the flag for collection C3 condition 0. Using the collection condition data structure 1000, the system may determine that all conditions for collections C1 and C2 are met, because the flags for these collections are all set to condition met. The system may generate a relationship in the data graph between the Barack Obama node and the collection node Political Science Lawyers. If the data graph does not already include a Political Science Lawyers node it may generate one. Furthermore, the system may use the Member index 820 and the Not Member index 825 to determine if the C1 or C2 collections are in either index. If so, the system may set additional flags in the collection condition data structure 1000, or additional violations, as appropriate. The C2 collection includes a constraint with a Template type. Thus, the system may use the value U.S.A. from the Temporary Matching Value data structure 1002 to generate a relationship in the data graph between the Barack Obama node and the collection node Presidents of U.S.A. As indicated above, if this node does not already exist, the system may create it.

For readability, the examples above refer to nodes and relationships by names or description. It is understood that the system may use other identifiers in the data structures, the indices, the constraints etc. without departing from disclosed implementations. As demonstrated, the system may determine a node's membership in every collection in the indices in one pass of the neighborhood because each path can be matched to constraints from different collections as the path is encountered. Thus, the system may calculate collection membership for a very large data graph efficiently. It is also understood that while the examples have been directed towards a system using conjunctive normal form for conditions, some implementations may use disjunctive normal form, where constraints within a condition are conjunctive, with appropriate modifications to the processes that determine collection membership in one pass.

Figure 11:
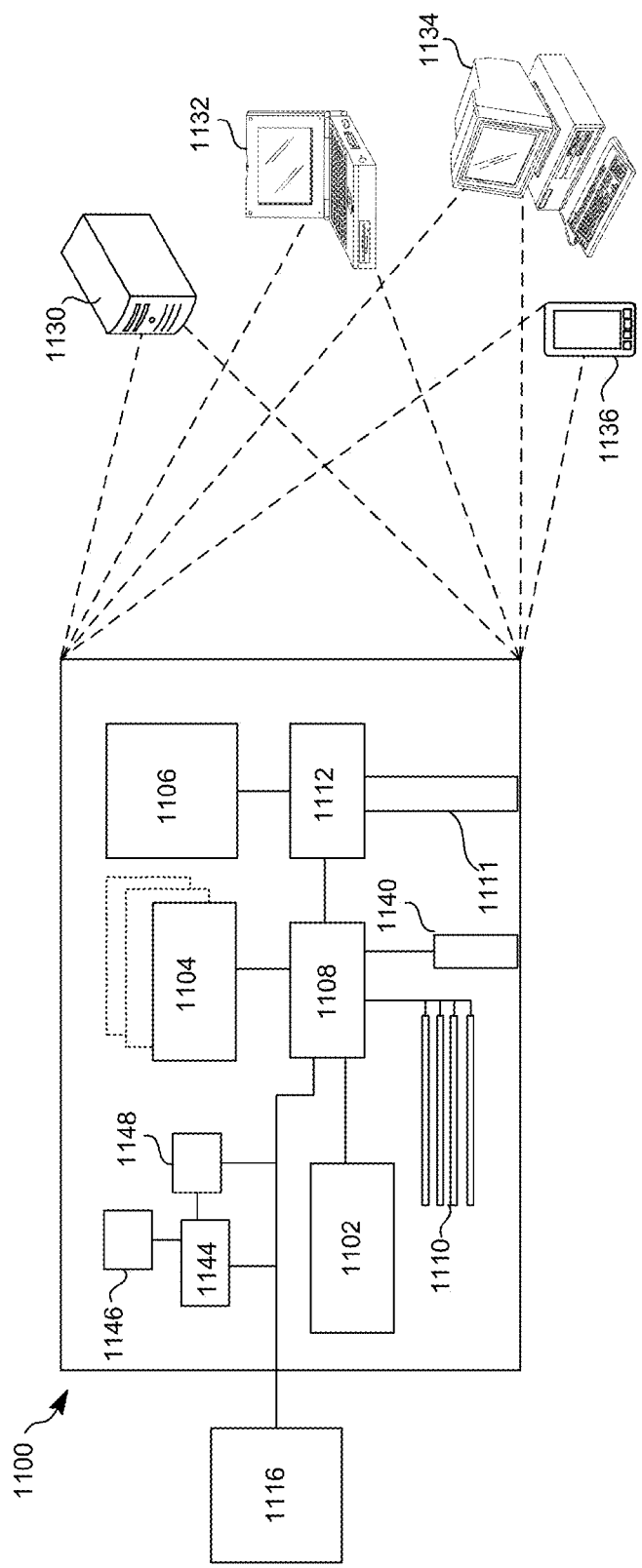
FIG. 11 shows an example of a computer device that can be used to implement the described techniques.

FIG. 11 shows an example of a generic computer device 1100, which may be system 100, and/or client 180 of FIG. 1, which may be used with the techniques described here. Computing device 1100 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 1100 includes a processor 1102, memory 1104, a storage device 1106, and expansion ports 1110 connected via an interface 1108. In some implementations, computing device 1100 may include transceiver 1146, communication interface 1144, and a GPS (Global Positioning System) receiver module 1148, among other components, connected via interface 1108. Device 1100 may communicate wirelessly through communication interface 1144, which may include digital signal processing circuitry where necessary. Each of the components 1102, 1104, 1106, 1108, 1110, 1140, 1144, 1146, and 1148 may be mounted on a common motherboard or in other manners as appropriate.

The processor 1102 can process instructions for execution within the computing device 1100, including instructions stored in the memory 1104 or on the storage device 1106 to display graphical information for a GUI on an external input/output device, such as display 1116. Display 1116 may be a monitor or a flat touchscreen display. In some implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk. In some implementations, the memory 1104 may include expansion memory provided through an expansion interface.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 1104, the storage device 1106, or memory on processor 1102.

The interface 1108 may be a high speed controller that manages bandwidth-intensive operations for the computing device 1100 or a low speed controller that manages lower bandwidth-intensive operations, or a combination of such controllers. An external interface 1140 may be provided so as to enable near area communication of device 1100 with other devices. In some implementations, controller 1108 may be coupled to storage device 1106 and expansion port 1114. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1130, or multiple times in a group of such servers. It may also be implemented as part of a rack server system. In addition, it may be implemented in a personal computer such as a laptop computer 1132, or smart phone 1136. An entire system may be made up of multiple computing devices 1100 communicating with each other. Other configurations are possible.

FIG. 12 shows an example of a generic computer device 1200, which may be system 100 of FIG. 1, which may be used with the techniques described here. Computing device 1200 is intended to represent various example forms of large-scale data processing devices, such as servers, blade servers, datacenters, mainframes, and other large-scale computing devices. Computing device 1200 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1200 may include any number of computing devices 1280. Computing devices 1280 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1280a includes multiple racks 1258a-1258n. Each rack may include one or more processors, such as processors 1252a-1252n and 1262a-1262n. The processors may include data processors, network attached storage devices, and other computer controlled devices. In some implementations, one processor may operate as a master processor and control the scheduling and data distribution tasks. Processors may be interconnected through one or more rack switches 1258, and one or more racks may be connected through switch 1278.

Switch 1278 may handle communications between multiple connected computing devices 1200.

Each rack may include memory, such as memory 1254 and memory 1264, and storage, such as 1256 and 1266. Storage 1256 and 1266 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1256 or 1266 may be shared between multiple processors, multiple racks, or multiple computing devices and may include a computer-readable medium storing instructions executable by one or more of the processors. Memory 1254 and 1264 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1254 may also be shared between processors 1252*a*-1252*n*. Data structures, such as an index, may be stored, for example, across storage 1256 and memory 1254. Computing device 1200 may include other components not shown, such as controllers, buses, input/output devices, communications modules, etc.

An entire system, such as system 100, may be made up of multiple computing devices 1200 communicating with each other. For example, device 1280*a* may communicate with devices 1280*b*, 1280*c*, and 1280*d*, and these may collectively be known as system 100. As another example, system 100 of FIG. 1 may include one or more computing devices 1200 as collection membership engine 150. Furthermore, some of the computing devices may be located geographically close to each other, and others may be located geographically distant. The layout of system 1200 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Random Access Memory (RAM) and Read Only Memory (ROM)), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   at least one processor; and
   one or more memories storing:
      a knowledge base including entities connected by edges, wherein the edges represent at least thousands of factual relationships that may link two of the entities, and
      instructions that, when executed by the at least one processor, cause the computer system to:
         determine a first set of entities from the knowledge base,
         determine a second set of constraints, the second set including a quantity of constraints, wherein a constraint in the second set identifies a constraint type and identifies a path of at least one edge in the knowledge base that is shared by at least two of the entities in the first set,
         generate candidate collection definitions from combinations of the constraints in the second set, where each candidate collection definition identifies one or more constraints from the second set in conjunctive normal form,
         prune the candidate collection definitions by discarding candidate collection definitions having an information gain that fails to meet a threshold, and
         store at least one of the candidate collection definitions as a candidate collection in the one or more memories, the candidate collection having an information gain that meets the threshold, wherein the candidate collection definition is used to determine entities in the knowledge base belonging to the candidate collection.

2. The system of claim 1, wherein determining the first set of entities includes:
   selecting a category from a crowd-sourced document corpus; and
   determining entities identified by the category.

3. The system of claim 1, wherein determining the first set of entities includes:
   identifying a popular query from search records;
   converting the popular query to at least one semantic query; and executing the at least one semantic query against the knowledge base to obtain a query result, wherein the first set of entities is the query result from the knowledge base.

4. The system of claim 3, wherein converting the popular query to at least one semantic query includes:
converting the popular query to a plurality of semantic queries;
running each of the plurality of semantic queries against the knowledge base; and
determining a plurality of sets of entities, a set of the plurality of sets representing entities responsive to one of the semantic queries.

5. The system of claim 1, wherein the instructions further include instructions that, when executed by the at least one processor, cause the computer system to:
generate a collection name for the candidate collection definition based on properties from the knowledge base associated with the constraints of the candidate collection definition.

6. The system of claim 5, wherein generating the collection name includes:
for each constraint associated with the candidate collection definition:
when the constraint identifies a relationship and an object entity, determining a name for the object entity and pluralizing the name, and
when the constraint identifies a relationship without an object entity, determining a name for the relationship; and
generating the collection name from a combination of the determined names for the constraints associated with the candidate collection definition.

7. The system of claim 1, wherein determining the second set of constraints includes:
generating a correlation score for respective constraints; and
using the correlation scores to select the quantity of constraints.

8. The system of claim 1, wherein the instructions further include instructions that, when executed by the at least one processor, cause the computer system to:
determine that a first candidate collection definition and a second candidate collection definition are compatible; and
merge the first candidate collection definition and the second candidate collection definition into a third candidate collection definition responsive to the determining.

9. The system of claim 8, wherein determining that the first candidate collection definition and the second candidate collection definition are compatible includes:
determining that a constraint for the first candidate collection definition is equivalent with a constraint for the second candidate collection definition; and
generating a condition for the third candidate collection definition that represents a union of the constraint for the first candidate collection definition and the constraint for the second candidate collection definition.

10. The system of claim 9, wherein the one or more memories further stores a table indicating relationship equivalencies and wherein the instructions further include instructions that cause the computer system to:
determine that the constraint for the first candidate is a relationship in the table for a particular equivalency;
convert the constraint for the first candidate to a first union that includes the equivalents for the constraint;
determine that the constraint for the second candidate is a second relationship in the table for the particular equivalency;
convert the constraint for the second candidate to a second union that includes the equivalents for the constraint; and
determine that the first union and the second union are identical,
wherein the condition for the third candidate represents the first union.

11. The system of claim 9, wherein the one or more memories further store a table indicating source constraints for a target constraint and wherein the instructions further include instructions that cause the computer system to:
determine that the constraint for the first candidate is a source constraint for the target constraint;
convert the constraint for the first candidate to the target constraint;
determine that the constraint for the second candidate is a source constraint for the target constraint;
convert the constraint for the second candidate to the target constraint; and
determine that the converted constraints are identical,
wherein the condition for the third candidate represents the target constraint.

12. The system of claim 1, the instructions further include instructions that, when executed by the at least one processor, cause the computer system to:
score the candidate collection based on search records; and
publish the candidate collection definition when the score meets a score threshold.

13. The system of claim 12, wherein scoring the candidate collection includes:
generating queries from the candidate collection;
inspecting the search records for popularity indicators for the generated queries; and
using the popularity indicators to score the candidate collection.

14. The system of claim 12, wherein publishing the candidate collection occurs subsequent to curation of a collection name.

15. The system of claim 1, wherein using the candidate collection to determine entities in the knowledge base belonging to the candidate collection includes:
determining, responsive to receiving a query that corresponds to the at least one collection definition, first entities in the knowledge base that meet the at least one constraint in the collection definition of the at least one collection; and
providing information about the first entities as a response to the query.

16. A method comprising:
determining, using at least one processor, a first set of entities from a knowledge base of entities connected by edges, wherein the edges represent at least thousands of factual relationships that may link two of the entities;
determining a plurality of constraints, each constraint identifying a constraint type and identifying a target node and a path of at least one edge leading to the target node from at least two of the entities in the first set;
generating, using the at least one processor, a correlation score for each of the plurality of constraints;
using the correlation scores to select a quantity of constraints for a set of constraints;
generating, using the at least one processor, candidate collection definitions from combinations of the set of constraints, where each candidate collection definition identifies one or more constraints from the set of constraints in conjunctive normal;

pruning the candidate collection definitions by discarding candidate collection definitions having an information gain that fails to meet a threshold; and storing at least one of the candidate collection definitions as a candidate collection in a memory, the candidate collection having an information gain that meets the threshold.

17. The method of claim 16, wherein determining the first set of entities includes:

selecting a category from a crowd-sourced document corpus; and determining entities identified by the category.

18. The method of claim 16, wherein determining the first set of entities includes:

identifying a popular query from search records;

converting the popular query to a semantic query; and executing the at least one semantic query against the knowledge base to obtain a query result, wherein the first set of entities is the query result from the knowledge base.

19. The method of claim 16, further comprising:

generating a collection name for the candidate collection definition based on properties from the knowledge base associated with the constraints of the candidate collection definition.

20. The method of claim 16, wherein the candidate collection is a first candidate collection and the method further comprises:

determining that the first candidate collection and a second candidate collection are compatible; and merging the first candidate collection and the second candidate collection into a third candidate collection definition responsive to the determining.

21. The method of claim 16, further comprising:

scoring the candidate collection based on search records; and using the score to prioritize the candidate collection for name curation.

22. A computer system comprising:

at least one processor; and one or more memories storing:

a knowledge base including entities connected by edges, wherein the edges represent at least thousands of factual relationships that may link two of the entities, candidate collection definitions, each collection definition including one or more constraints in conjunctive normal form, a constraint identifying a constraint type and identifying representing a path in the knowledge base, and instructions that, when executed by the at least one processor, cause the computer system to:

generate a name for a first candidate collection definition of the candidate collection definitions based on properties of the paths identified by the constraints of the candidate collection definition, and provide the name as a suggestion to a curator of the candidate collection definitions.

23. The system of claim 22, wherein generating the name includes:

for each constraint associated with the candidate collection definition:

when the constraint identifies a relationship and an object entity, determining a name for the object entity and pluralizing the name, and when the constraint identifies a relationship without an object entity, determining a name for the relationship; and generating the name from a combination of the determined names for the constraints associated with the candidate collection definition.

24. The system of claim 22, wherein the knowledge base includes a mediator for a relationship and generating the name for the first candidate collection definition includes:

determining that a constraint associated with the candidate collection definition includes the relationship with the mediator; and using the mediator in generating the name.

25. The system of claim 22, wherein the instructions further include instructions that, when executed by the at least one processor, cause the computer system to:

generate the name when it is determined that the first candidate collection definition does not include a condition with disjunctive constraints.

26. The system of claim 22, wherein the instructions further include instructions that, when executed by the at least one processor, cause the computer system to:

generate at least two names based on the properties from the knowledge base; and provide the at least two names as suggestions.

* * * * *

UNITED STATES PATENT AND TRADEMARK OFFICE
CERTIFICATE OF CORRECTION

PATENT NO. : 9,454,599 B2  
APPLICATION NO. : 14/186320  
DATED : September 27, 2016  
INVENTOR(S) : Golden et al.

Page 1 of 1

It is certified that error appears in the above-identified patent and that said Letters Patent is hereby corrected as shown below:

In the Claims

In Column 35, Line 3, Claim 16, delete "normal;" and insert --normal form;--, therefor.

Signed and Sealed this
Twenty-ninth Day of May, 2018

Andrei Iancu
*Director of the United States Patent and Trademark Office*